United States Patent
Caldwell et al.

(10) Patent No.: US 9,397,339 B2
(45) Date of Patent: Jul. 19, 2016

(54) CATHODE FOR A BATTERY

(75) Inventors: Marissa Caldwell, San Diego, CA (US);
Steven Kaye, San Diego, CA (US);
Cory O'Neill, San Diego, CA (US); Wei Tong, San Diego, CA (US)

(73) Assignee: Wildcat Discovery Technologies, Inc., San Diego, CA (US)

( * ) Notice: Subject to any disclaimer, the term of this patent is extended or adjusted under 35 U.S.C. 154(b) by 0 days.

(21) Appl. No.: 13/612,800

(22) Filed: Sep. 12, 2012

(65) Prior Publication Data

US 2013/0065126 A1  Mar. 14, 2013

Related U.S. Application Data

(60) Provisional application No. 61/621,205, filed on Apr. 6, 2012, provisional application No. 61/533,911, filed on Sep. 13, 2011.

(51) Int. Cl.

| | |
|---|---|
| *H01M 2/02* | (2006.01) |
| *H01M 4/62* | (2006.01) |
| *H01B 1/12* | (2006.01) |
| *H01M 4/02* | (2006.01) |
| *H01M 4/04* | (2006.01) |
| *H01M 4/36* | (2006.01) |
| *H01M 4/38* | (2006.01) |
| *H01M 4/583* | (2010.01) |

(52) U.S. Cl.
CPC .................. *H01M 4/624* (2013.01); *H01B 1/12* (2013.01); *H01B 1/124* (2013.01); *H01B 1/127* (2013.01); *H01B 1/128* (2013.01); *H01M 4/02* (2013.01); *H01M 4/0402* (2013.01); *H01M 4/366* (2013.01); *H01M 4/382* (2013.01); *H01M 4/5835* (2013.01)

(58) Field of Classification Search
CPC . Y02E 60/122; Y02E 60/521; H01M 10/025; H01M 4/583; H01M 4/625; H01M 4/366; H01M 4/622; H01M 4/661; H01M 2300/0082; H01M 4/60; H01M 10/0565; H01M 4/8828; H01M 8/0286
IPC ............... Y02E 60/122, 60/521; H01M 10/025, H01M 4/583, 4/625, 4/366, 4/622, 4/661, H01M 2300/0082, 4/60, 10/0565, 4/8828, H01M 8/0286
See application file for complete search history.

(56) References Cited

U.S. PATENT DOCUMENTS

| | | | |
|---|---|---|---|
| 7,651,647 B1 | 1/2010 | Strange et al. | |
| 2003/0027049 A1 | 2/2003 | Barker et al. | |

(Continued)

FOREIGN PATENT DOCUMENTS

WO    2012137572 A9    12/2012

OTHER PUBLICATIONS

Arbizzani et al, "Li1.01Mn1.97O4 surface modification by poly(3,4-ethylenedioxythiophene)," Journal of Power Sources 119-121 (2003) 695-700.

(Continued)

*Primary Examiner* — Mark F Huff
*Assistant Examiner* — Monique Wills
(74) *Attorney, Agent, or Firm* — Corridor Law Group, P.C.

(57) ABSTRACT

An electrode for an electrochemical cell including an active electrode material and an intrinsically conductive coating wherein the coating is applied to the active electrode material by heating the mixture for a time and at a temperature that limits degradation of the cathode active material.

14 Claims, 14 Drawing Sheets

(56) References Cited

U.S. PATENT DOCUMENTS

| | | | |
|---|---|---|---|
| 2004/0140458 A1 | 7/2004 | Ravet et al. | |
| 2006/0019163 A1 | 1/2006 | Amatucci et al. | |
| 2008/0199772 A1 | 8/2008 | Amatucci et al. | |
| 2009/0035204 A1 | 2/2009 | Xu et al. | |
| 2010/0035155 A1* | 2/2010 | Okada et al. | 429/221 |
| 2010/0059706 A1 | 3/2010 | Dai et al. | |
| 2010/0123116 A1* | 5/2010 | Ghenciu | B82Y 10/00 257/4 |
| 2010/0129713 A1 | 5/2010 | Yazami et al. | |
| 2010/0261063 A1* | 10/2010 | Kitagawa | C01B 25/37 429/232 |
| 2010/0297496 A1 | 11/2010 | Ravet et al. | |
| 2011/0086273 A1 | 4/2011 | Ravet et al. | |
| 2011/0159360 A1* | 6/2011 | Hirota et al. | 429/206 |
| 2011/0212365 A1* | 9/2011 | Audemer et al. | 429/221 |
| 2011/0229761 A1 | 9/2011 | Cui et al. | |
| 2012/0058397 A1* | 3/2012 | Zhamu et al. | 429/231.8 |
| 2012/0177991 A1* | 7/2012 | Mogi et al. | 429/211 |
| 2013/0059193 A1* | 3/2013 | Scordilis-Kelley et al. | 429/156 |
| 2013/0065126 A1 | 3/2013 | Caldwell et al. | |

OTHER PUBLICATIONS

Hu et al, "Electrochemical Performance of Sol-Gel Synthesized LiFePO4 in Lithium Batteries," Journal of the Electrochemical Society, 151 (8) A1279-A1285 (2004).

International Search Report and Written Opinion issued in connection with PCT/2012/054953 on Jan. 31, 2013.

Meduri et al, "Hybrid CFx-Ag2V4O11 as a high-energy, power density cathode for application in an underwater acoustic microtransmitter," Electrochem. Commun. (2011), doi:10.1016/j.elecom.2011.08.006.

Zhang et al, "Carbon-coated fluorinated graphite for high energy and high power densities primary lithium batteries," Journal of Power Sources 195 (2010) 2914-2917.

International Search Report of PCT/US2014/028271 Aug. 11, 2014.

* cited by examiner

CATHODE FOR A BATTERY

This application claims priority to and the benefit of U.S. Provisional Application No. 61/533,911 filed Sep. 13, 2011 entitled "Cathode for Metal-Fluoride Battery" and U.S. Provisional Application No. 61/621,205 filed Apr. 6, 2012 entitled "Cathode for a Battery," both of which applications are incorporated herein by reference in their entirety.

BACKGROUND OF THE INVENTION

The present invention is in the field of battery technology, and more particularly in the area of using coatings to enhance electrolyte and electrode performance in batteries including metal-fluoride, carbon-fluoride, or oxide-based electrode materials.

One type of battery consists of a negative electrode made primarily from lithium and a positive electrode made primarily from a compound containing carbon and fluorine. During discharge, lithium ions and electrons are generated from oxidation of the negative electrode while fluoride ions and carbon are produced from reduction of the positive electrode. The generated fluoride ions react with lithium ions near the positive electrode to produce a compound containing lithium and fluorine, which may deposit at the positive electrode surface.

Lithium/carbon-fluoride batteries enjoy widespread use and commercial applicability in part due to certain desirable characteristics. The carbon-fluoride positive electrode is lightweight, which makes the battery desirable in portable or mobile applications where weight is an important design consideration. Also, the carbon-fluoride positive electrode has a high capacity. Further, the overall reaction has a high electrochemical potential.

Another type of battery consists of a negative electrode made primarily from lithium and a positive electrode made primarily from a compound containing metal oxides. During charge and discharge cycles, lithium ions migrate from one electrode to the other where the direction of migration depends on the cycle.

Despite their widespread use, both types of batteries suffer from certain challenges.

The batteries have comparatively low electrical conductivity as compared to certain other battery materials. Such comparatively low electrical conductivity can have the following results in an electrochemical cell: comparatively low power; comparatively low operating voltage; comparatively large underpotential upon discharge; and a comparatively low capacity during a high rate of discharge.

The batteries have comparatively low thermal conductivity as compared to certain other battery materials and such comparatively low thermal conductivity can result in comparatively significant heat generation by the electrochemical cell upon discharge.

There have been prior attempts to address such challenges. One prior attempt involves forming a composite positive electrode. The raw composite material contains a carbon-fluoride compound and a second compound, which is comparatively more electrically conductive than the carbon-fluoride compound. These two compounds are mixed together to form a composite material that is then formed into a positive electrode.

One example of such a composite material is a carbon-fluoride compound composited with silver vanadium oxide (silver vanadium oxide is often abbreviated as "SVO" in the battery industry rather than by its periodic table symbols). This CF/SVO composite material has been used to form a positive electrode in a battery for use in medical devices and has demonstrated increased pulse power and increased energy density when compared to a battery using a positive electrode formed only from carbon-fluoride.

Another example of a composite material for use in forming a positive electrode is a carbon-fluoride compound composited with manganese dioxide ($MnO_2$). This $CF/MnO_2$ composite material has been used to form a positive electrode where cost is a key design factor and has demonstrated increased power at high discharge rates, increased energy density, and reduced heat buildup in the electrochemical cell when compared to a battery using a positive electrode formed only from carbon-fluoride.

Although prior batteries using positive electrodes formed from these and certain other composite materials generally have higher power, higher operating potential, lower underpotential, and less heat buildup when compared to batteries using a positive electrode formed only from metal-fluoride or carbon-fluoride, the performance of the electrochemical cell could be improved significantly. Also, certain of these performance improvements come at the expense of reduced energy density.

In some prior batteries, conductive coatings have been applied to electrode materials. In secondary battery applications, some electrodes have been formed from carbon-coated $LiFePO_4$. And, some research has occurred on coating carbon-fluoride compounds used for electrodes in primary batteries (see Q. Zhang, et al., Journal of Power Sources 195 (2010) 2914-2917). Prior art coatings are typically applied at high temperatures which can degrade cathode active materials. Thus, temperature-sensitive active materials for cathodes have not typically been coated with conductive carbon materials.

Certain embodiments of the present invention address the challenges found in batteries. Certain embodiments of the present invention can be used to form electrochemical cells for batteries that exhibit lower underpotential, higher power, higher capacity at a high discharge rate, less heat generation, or faster heat dissipation when compared to prior batteries.

These and other challenges can be addressed by embodiments of the present invention described below.

BRIEF SUMMARY OF THE INVENTION

Certain embodiment of the invention include an electrode for an electrochemical cell including an active electrode material, a binder material, and an intrinsically conductive coating wherein the coating is applied to the active electrode material. In certain embodiments, the intrinsically conductive coating is formed from an organic coating compound comprising a conjugated core. In certain embodiments, the intrinsically conductive coating is formed from an organic coating compound comprising a conjugated core in which at least 90% of the carbon atoms are sp or sp2 hybridized. In certain embodiments, the intrinsically conductive coating is formed from an organic coating compound in which at least 35% of the carbon atoms are sp or sp2 hybridized.

Certain embodiments of the invention include a method of making an electrode for an electrochemical cell including combining a coating compound characterized by having an intrinsic conductivity and an active electrode material to form a mixture, heating the mixture to form a conductively coated active electrode material, wherein the mixture is heated for a time and at a temperature that limits degradation of the active electrode material, mixing the conductively coated active electrode material with a binder material and a conductive additive to form an electrode-forming mixture, and heating the electrode-forming mixture to form the electrode. In certain embodiments, the coating compound is heated at less than about 450 degrees C. In certain embodiments, the coating compound is heated for a time in a range of from about 0 hours to about 6 hours.

Certain embodiments include the method of making an electrochemical cell containing coated cathode materials and methods of use of such electrochemical cells.

DETAILED DESCRIPTION OF THE INVENTION

Figure 1A:
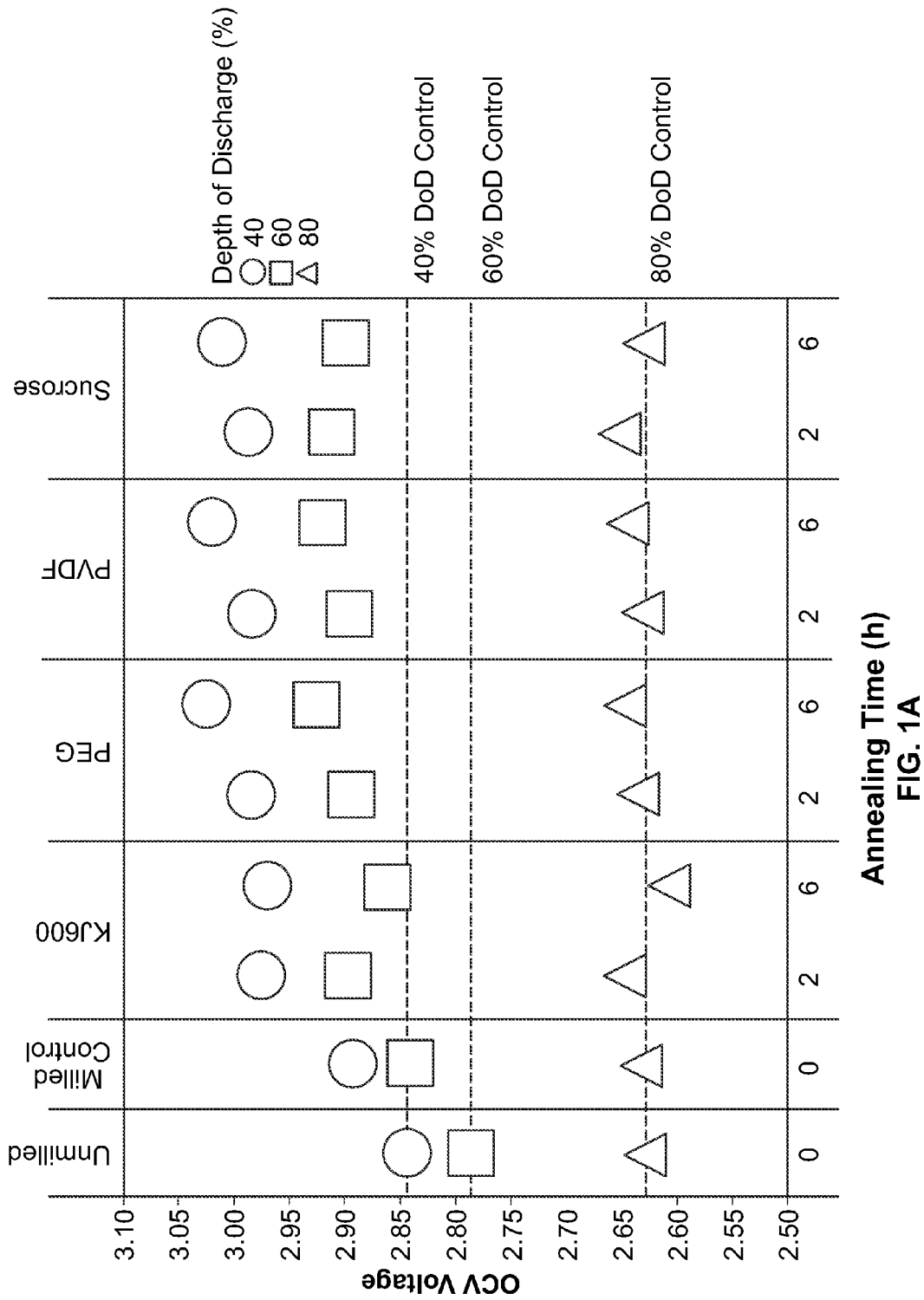
FIGS. 1A and 1B depict the results of testing of an electrochemical cell containing cathode active materials coated according to certain embodiments of the invention as compared to control. Certain coating materials demonstrate improved voltage performance.

The following definitions apply to some of the aspects described with respect to some embodiments of the invention. These definitions may likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

The terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

The term "about" refers to the range of values approximately near the given value in order to account for typical tolerance levels, measurement precision, or other variability of the embodiments described herein.

The terms "coating," "coat," "coated," and the like refer to a relatively thin film of material on the surface of a substrate and the process of making the same. The terms include films that are continuous and films that are discontinuous.

The terms "conductive," "conductor," "conductivity," and the like refer to the intrinsic ability of a material to facilitate electron or ion transport and the process of doing the same. The terms include materials whose ability to conduct electricity may be less than typically suitable for conventional electronics applications but still greater than an electrically-insulating material.

The term "core" and the like refers to the central moiety of a molecule as opposed to pendant groups on the molecule. The core may occupy the entire molecule. The shape of the molecule is not determinative of the presence or lack of a core.

The term "solvent" and the like refers to a materials capable of at least partially dissolving another material. The term includes a single solvent or a mixture containing one or more solvents, and such mixture can include non-solvents.

The term "slurry" and the like refers to a mixture in which at least some amount of one or more components is not dissolved in the solvent, and includes mixtures of two materials where the mixture is formed without a solvent or the mixture that results when solvent is substantially removed but before the final product or article to be made from the mixture has been formed.

The term "active material" and the like refers to the material in an electrode, particularly in a cathode, that donates, liberates, or otherwise supplies the conductive species during an electrochemical reaction in an electrochemical cell.

Certain embodiments of the invention related to compounds useful for the formation of conductive coatings on active materials. Preferably, the compounds of embodiments of the invention are used to coat active materials that degrade, decompose, or are otherwise rendered unsuitable or undesirable for use after exposure to high temperatures or high temperature under an inert atmosphere, where high temperatures are those higher than about 500 degrees C. The compounds are capable of forming conductive coatings at temperatures less than about 500 degrees C. on such active materials.

In certain embodiments, conductive coatings are used to improve the electrical conductivity of desirable active materials, including metal-fluoride and carbon-fluoride active materials. In certain embodiments, conductive coatings are used to improve the electrical conductivity of iron-fluoride compounds (such as $FeF_3$), manganese-fluoride compounds (such as $MnF_3$), copper-fluoride compounds (such as $CuF_2$), and carbon-fluoride compounds. In certain embodiments, conductive coatings are used to improve the electrical conductivity of lithium-manganese-nickel-oxygen (LMNO) compounds, lithium-manganese-oxygen (LMO) compounds, and lithium-rich layered oxide compounds. More generally, conductive coatings are used to improve active materials for cathodes including phosphates, fluorophosphates, fluorosulphates, silicates, spinels, and composite layered oxides.

For example, a class of suitable phosphate active materials can be represented as: $Li_a(M1_bM2_cM3_dM4_e)PO_4$, where M1, M2, M3, and M4 can be the same or different, M1 is Mn, Co, or Ni, M2 is a transition metal, such as Ti, V, Cr, Mn, Fe, Co, Ni, Zr, Nb, or Mo, M3 is a transition metal or a main group element, optionally excluding elements of Group VIA and Group VIIA, M4 is a transition metal or a main group element, optionally excluding elements of Group VIA and Group VIIA, $1.2 \geq a \geq 0.9$ (or $1.2 > a > 0.9$), $1 \geq b \geq 0.6$ (or $1 > b > 0.6$), $0.4 \geq c \geq 0$ (or $0.4 > c > 0$), $0.2 \geq d \geq 0$ (or $0.2 > d > 0$), $0.2 \geq e \geq 0$ (or $0.2 > e > 0$), and $1.2 \geq f \geq 0.9$ (or $1.2 > f > 0.9$). Additional details regarding this class of active materials can be found in Goodenough et al., "Challenges for Rechargeable Li Batteries," Chemistry of Materials 22, 587-603 (2010); Marom et al., "A review of advanced and practical lithium battery materials," J. Mater. Chem., 21, 9938 (2011); Zhi-Ping et al., "Li-Site and Metal-Site Ion Doping in Phosphate-Olivine $LiCoPO_4$ by First-Principles Calculation," Chin. Phys. Lett. 26 (3) 038202 (2009); and Fisher et al., "Lithium Battery Materials $LiMPO_4$ (M) Mn, Fe, Co, and Ni): Insights into Defect Association, Transport Mechanisms, and Doping Behavior," Chem. Mater. 2008, 20, 5907-5915; the disclosures of which are incorporated herein by reference in their entirety.

For example, another class of suitable phosphate active materials can comprise lithium (Li), cobalt (Co), a first transition metal (M1), a second transition metal (M2) different from M1, and phosphate ($PO_4$), where M1 and M2 are each selected from iron (Fe), titanium (Ti), vanadium (V), niobium (Nb), zirconium (Zr), hafnium (Hf), molybdenum (Mo), tantalum (Ta), tungsten (W), manganese (Mn), copper (Cu), chromium (Cr), nickel (Ni), and zinc (Zn) (e.g., as dopants and/or oxides thereof), and can have molar ratios of Li:Co: M1:M2:$PO_4$ defined by $(1-x):(1-y-z):y:z:(1-a)$, respectively, optionally represented (as a shorthand notation) as: $Li_{(1-x)}Co_{(1-y-z)}M1_y:M2_z:(PO_4)_{(1-a)}$, where $-0.3 \leq x \leq 0.3$; $0.01 \leq y \leq 0.5$; $0.01 \leq z \leq 0.3$; $-0.5 \leq a \leq 0.5$; and $0.2 \leq 1-y-z \leq 0.98$. Preferably, M1 and M2 are each selected from iron (Fe), titanium (Ti), vanadium (V) and niobium (Nb) (e.g., as dopants and/or oxides thereof). Preferably, M1 is iron (Fe) (e.g., as a dopant and/or oxide thereof), M2 is selected from titanium (Ti), vanadium (V), and niobium (Nb) (e.g., as dopants and/or oxides thereof). Preferably, $-0.3 \leq x < 0$, $-0.2 \leq x < 0$, or $-0.1 \leq x < 0$. Preferably, M2 is Ti, and $0.05 \leq z \leq 0.25$ or $0.05 \leq z \leq 0.2$. Preferably, M2 is V, and $0.03 \leq z \leq 0.25$ or $0.05 \leq z \leq 0.2$. Preferably, $0.3 \leq 1-y-z \leq 0.98$, $0.51 \leq 1-y-z \leq 0.98$, or $0.7 \leq 1-y-z \leq 0.98$. Additional details regarding this class of cathode materials can be found in co-owned U.S. Provisional Application No. 61/426,733, entitled "Lithium Ion Battery Materials with Improved Properties" and filed on Dec. 23, 2010, the disclosure of which is incorporated herein by reference in its entirety.

For example, a class of suitable fluorophosphates active materials can be represented as: $Li_a(M1_bM2_cM3_dM4_e)_fPO_4F_g$, where M1, M2, M3, and M4 can be the same or different, M1 is Mn, Co, or Ni, M2 is a transition metal, such as Ti, V, Cr, Mn, Fe, Co, Ni, Zr, Nb, or Mo, M3 is a transition metal or a main group element, optionally excluding elements of Group VIA and Group VIIA, M4 is a transition metal or a main group element, optionally excluding elements of Group VIA and Group VIIA, $1.2 \geq a \geq 0.9$ (or $1.2 > a > 0.9$), $1 \geq b \geq 0.6$ (or $1 > b > 0.6$), $0.4 \geq c \geq 0$ (or $0.4 > c > 0$), $0.2 \geq d \geq 0$ (or $0.2 > d > 0$), $0.2 \geq e \geq 0$ (or $0.2 > e > 0$), $1.2 \geq f \geq 0.9$ (or $1.2 > f > 0.9$), and $1.2 \geq g \geq 0$ (or $1.2 > g > 0$).

For example, a class of suitable fluorosilicate active materials can be represented as: $Li_a(M1_bM2_cM3_dM4_e)_fSiO_4$, where M1, M2, M3, and M4 can be the same or different, M1 is Mn, Co, or Ni, M2 is a transition metal, such as Ti, V, Cr, Mn, Fe, Co, Ni, Zr, Nb, or Mo, M3 is a transition metal or a main group element, optionally excluding elements of Group VIA and Group VIIA, M4 is a transition metal or a main group element, optionally excluding elements of Group VIA and Group VIIA, $2.2 \geq a \geq 0.9$ (or $2.2 > a > 0.9$), $1 \geq b \geq 0.6$ (or $1 > b > 0.6$), $0.4 \geq c \geq 0$ (or $0.4 > c > 0$), $0.2 \geq d \geq 0$ (or $0.2 > d > 0$), $0.2 \geq e \geq 0$ (or $0.2 > e > 0$), and $1.2 \geq f \geq 0.9$ (or $1.2 > f > 0.9$).

For example, a class of suitable spinel active materials can be represented as: $Li_a(M1_bM2_cM3_dM4_e)_fO_4$, where M1, M2, M3, and M4 can be the same or different, M1 is Mn or Fe, M2 is Mn, Ni, Fe, Co, or Cu, M3 is a transition metal, such as Ti, V, Cr, Mn, Fe, Co, Ni, Zr, Nb, or Mo, and M4 is a transition metal or a main group element, optionally excluding elements of Group VIA and Group VIIA, $1.2 \geq a \geq 0.9$ (or $1.2 > a > 0.9$), $1.7 \geq b \geq 1.2$ (or $1.7 > b > 1.2$), $0.8 \geq c \geq 0.3$ (or $0.8 > c > 0.3$), $0.1 \geq d \geq 0$ (or $0.1 > d > 0$), $0.1 \geq e \geq 0$ (or $0.1 > e > 0$), and $2.2 \geq f \geq 1.5$ (or $2.2 > f > 1.5$). LMNO-type cathode materials, such as $Li_{1.05}Mn_{1.5}Ni_{0.5}O_4$ and LMO-type materials, such as $LiMn_2O_4$ are included in this class. Additional details regarding this class of cathode materials can be found in Goodenough et al., "Challenges for Rechargeable Li Batteries," Chemistry of Materials 22, 587-603 (2010); Marom et al., "A review of advanced and practical lithium battery materials," J. Mater. Chem., 21, 9938 (2011); and Yi et al., "Recent developments in the doping of $LiNi_{0.05}Mn_{1.5}O_4$ cathode material for 5 V lithium-ion batteries," Ionics (2011) 17:383-389; the disclosures of which are incorporated herein by reference in their entirety.

For example, a class of suitable Li-rich layered oxide active materials can be represented as: $Li(Li_aM1_bM2_cM3_dM4_e)_fO_2$, where M1, M2, M3, and M4 can be the same or different, M1 is a transition metal, such as Mn, Fe, V, Co, or Ni, M2 is a transition metal, such as Mn, Fe, V, Co, or Ni, M3 is a transition metal, such as Mn, Fe, V, Co, or Ni, M4 is a transition metal or a main group element, optionally excluding elements of Group VIA and Group VIIA, $0.4 \geq a \geq 0.05$ (or $0.4 > a > 0.05$), $0.7 \geq b \geq 0.1$ (or $0.7 > b > 0.1$), $0.7 \geq c \geq 0.0$ (or $0.7 > c > 0.0$), $0.7 \geq d \geq 0.0$ (or $0.7 > d > 0.0$), $0.2 \geq e \geq 0$ (or $0.2 > e > 0$), and $1.2 \geq f \geq 0.9$ (or $1.2 > f > 0.9$). OLO-type materials are included in this class. Additional details regarding this class of cathode materials can be found in Goodenough et al., "Challenges for Rechargeable Li Batteries," Chemistry of Materials 22, 587-603 (2010); Marom et al., "A review of advanced and practical lithium battery materials" J. Mater. Chem., 21, 9938 (2011); Johnson et al., "Synthesis, Characterization and Electrochemistry of Lithium Battery Electrodes: $xLi_2MnO_3 \cdot (1-x) LiMn_{0.333}Ni_{0.333}Co_{0.333}O_2$ $(0<x<0.7)$," Chem. Mater., 20, 6095-6106 (2008); and Kang et al., "Interpreting the structural and electrochemical complexity of 0.5Li$_2$MnO$_3$.0.5LiMO$_2$ electrodes for lithium batteries (M=Mn$_{0.5-x}$Ni$_{0.5-x}$Co$_{2x}$, 0=x=0.5)," J. Mater. Chem., 17, 2069-2077 (2007); the disclosures of which are incorporated herein by reference in their entirety.

According to certain embodiments, active materials are coated using a precursor material. Suitable precursor materials facilitate the deposition of a conductive coating onto the active material, and in particular onto particles of the active material.

In certain embodiments, the precursor is a carbon-containing material. In these embodiments, the carbon precursor can be a polymer or a polymeric material. More generally, the carbon precursor can be anything that decomposes to form a conductive carbon upon heating (e.g., polymers, sugars, various biomolecules, etc.). Preferably, the precursor decomposes (or, in the specific case of carbon precursors, "carbonizes") below the decomposition temperature of the active material. For example, carbon-fluoride active materials may show substantial decomposition when heated to a temperature in the range from about 550 degrees C. to about 700 degrees C. Other examples of suitable carbon precursors include sucrose, poly(ethylene glycol), poly(vinylidene fluoride), polyacetal, polystyrene, polybutadiene, poly(vinyl alcohol), poly(vinyl chloride), polytetrafluoroethylene, polypropylene, polyethylene, poly(methyl methacrylate), polycarbonate, cellulose, carboxymethyl cellulose, and combinations thereof. Preferably, the polymer precursor to produces a substantially graphitic carbon coatings at temperatures below the range of decomposition temperatures for the carbon-fluoride active materials.

According to certain embodiments, the compounds useful for the formation of conductive carbon coatings on active materials are organic molecules with delocalized electron configurations. According to certain embodiments, the compounds are conductive organic molecules. It is understood that any compound with a high degree of electron delocalization or any compound with high conductivity could be used to form conductive coatings on active materials.

Generally speaking, delocalized electrons are electrons that are not limited to the orbital of a single atom, in the case of ions or metals, or a single covalent bond, in the case of organic materials. In carbon-based materials, bonds including a carbon atom can be a source for delocalized electrons when more than one of the four electrons in the outer energy levels of the carbon atom is in a covalent bond with another atom. Often, electron delocalization occurs in carbon-carbon bonds. These bonds are sometimes referred to as conjugated bonds.

According to hybridization theory, delocalized electrons can be described as mixing among inner and outer orbitals of an atom such as carbon. In carbon, hybridized orbitals can be sp$^3$ hybrids, sp$^2$ hybrids, and sp hybrids. Without being bound by theory or a particular mode of action, it is believed that organic materials with a high degree of sp or sp$^2$ hybridization are preferable for forming conductive carbon coatings on active materials. Compounds according to embodiments of the invention, contain conjugated cores in which many of the carbon atoms are sp or sp$^2$ hybridized. Compounds according to embodiments of the invention may be known for their intrinsic conductivity.

Conductive carbon coatings of the prior art, such as graphitic coatings, are formed from non-conductive carbon molecules with non-hybridized or sp$^3$ hybridized orbital electrons. Such materials are typically heated to high temperatures to decompose and graphitize them, often forming carbon coatings with sp$^2$ hybridized orbtials. In such coatings, it is known that the efficiency of the graphitization increases with temperature and that high temperature heat treatment gives the best performing coatings.

In contrast, compounds of certain embodiments do not require high temperature heat treatment due at least in part to their intrinsic conductivity. Compounds of the embodiments of the present invention do not require graphitization to provide a conductive carbon coating. Further, decomposition of compounds of embodiments of the invention may be undesirable as it would likely reduce or destroy the intrinsic conductivity of the compounds.

According to embodiments of the invention, compounds for coating active materials contain carbon atoms that are sp or sp$^2$ hybridized. Preferably, at least 35% of the carbon atoms in the compound are sp or sp$^2$ hybridized. Preferably, at least 40% of the carbon atoms in the compound are sp or sp$^2$ hybridized. Preferably, at least 45% of the carbon atoms in the compound are sp or sp$^2$ hybridized. Preferably, at least 50% of the carbon atoms in the compound are sp or sp$^2$ hybridized. Preferably, at least 55% of the carbon atoms in the compound are sp or sp$^2$ hybridized. Preferably, at least 60% of the carbon atoms in the compound are sp or sp$^2$ hybridized. Preferably, at least 65% of the carbon atoms in the compound are sp or sp$^2$ hybridized. Preferably, at least 70% of the carbon atoms in the compound are sp or sp$^2$ hybridized. Preferably, at least 75% of the carbon atoms in the compound are sp or sp$^2$ hybridized. Preferably, at least 80% of the carbon atoms in the compound are sp or sp$^2$ hybridized. Preferably, at least 85% of the carbon atoms in the compound are sp or sp$^2$ hybridized. Preferably, at least 90% of the carbon atoms in the compound are sp or sp$^2$ hybridized. Preferably, at least 95% of the carbon atoms in the compound are sp or sp$^2$ hybridized. Preferably, 100% of the carbon atoms in the compound are sp or sp$^2$ hybridized.

According to embodiments of the invention, compounds for coating active materials contain conjugated cores in which many of the carbon atoms are sp or sp$^2$ hybridized. Preferably, the compounds contain conjugated cores in which at least 35% of the carbon atoms are sp or sp$^2$ hybridized. Preferably, the compounds contain conjugated cores in which at least 40% of the carbon atoms are sp or sp$^2$ hybridized. Preferably, the compounds contain conjugated cores in which at least 45% of the carbon atoms are sp or sp$^2$ hybridized. Preferably, the compounds contain conjugated cores in which at least 50% of the carbon atoms are sp or sp$^2$ hybridized. Preferably, the compounds contain conjugated cores in which at least 55% of the carbon atoms are sp or sp$^2$ hybridized. Preferably, the compounds contain conjugated cores in which at least 60% of the carbon atoms are sp or sp$^2$ hybridized. Preferably, the compounds contain conjugated cores in which at least 65% of the carbon atoms are sp or sp$^2$ hybridized. Preferably, the compounds contain conjugated cores in which at least 70% of the carbon atoms are sp or sp$^2$ hybridized. Preferably, the compounds contain conjugated cores in which at least 75% of the carbon atoms are sp or sp$^2$ hybridized. Preferably, the compounds contain conjugated cores in which at least 80% of the carbon atoms are sp or sp$^2$ hybridized. Preferably, the compounds contain conjugated cores in which at least 85% of the carbon atoms are sp or sp$^2$ hybridized. Preferably, the compounds contain conjugated cores in which at least 90% of the carbon atoms are sp or sp$^2$ hybridized. Preferably, the compounds contain conjugated cores in which at least 95% of the carbon atoms are sp or sp$^2$ hybridized. Preferably, the compounds contain conjugated cores in 100% of the carbon atoms are sp or sp$^2$ hybridized.

Examples of compounds containing conjugated cores include but are not limited to: pentacene, anthracene, naphthalene, rubrene, C60, graphene, multi-walled carbon nanotubes (MWCNT), N,N'-dioctyl-3,4,9,10 perylenedicarboximide, perylene, pyrene, tetrathiafulvalene, polyaniline, 6,13-bis(triisopropylsilylethynyl)pentacene, 4-(heptadecafluorooctyl)aniline, poly(3-hexylthiophene-2,5-diyl), 7,7,8,8-tetracyanoquinodimethane, 11-phenoxylundecanoic acid, triphenylene, poly(2,6-naphthalenevinylene), octofluoronapthalene, oligothiophenes, hexabenzocoronene, phthalocyanine, p-quinquephenyl 8, and tetra-N-phenylbenzidine. More than one compound can be combined in a single coating to generate additive or enhanced performance.

Examples of carbon source coating materials according to certain embodiments of the invention include but are not limited to: PVDF, tris[4-(5-dicyanomethylidenemethyl-2-thienyl)phenyl]amine, triphenylene, tetrathiafulvalene, rubrene, pyrene, polyaniline (emeraldine base), poly(3-hexylthiophene-2,5-diyl), PNV, perylene-3,4,9,10-tetracarboxylic dianhydride, perylene, pentacene/MWCNT, pentacene/anthracene (4:1), pentacene/anthracene (1:4), pentacene-N-sulfinyl-tert-butylcarbamate, pentacene, naphthalene, N,Ni-dioctyl-3,4,9,10-perylenedicarboximide, dithieno[3,2-b:2?,3?-d]thiophene, dilithium phthalocyanine, dibenzotetrathiafulvalene, dibenz[a,h]anthracene, coronene, copper(II) phthalocyanine, C60, bis(ethylenedithio)tetrathiafulvalene, benz[b]anthracene, anthracene, 29H,31H-phthalocyanine, 11-phenoxyundecanoic acid, 7,7,8,8-tetracyanoquinodimethane, 6,13-bis(triisopropylsilylethynyl) pentacene, 5,10,15,20-tetrakis(pentafluorophenyl) porphyrin, 4-(heptadecafluorooctyl)aniline, 2,2':5',2":5",2"'-quaterthiophene, 1,8-naphthalic anhydride, 1,6-diphenyl-1,3,5-hexatriene, 1,4,5,8-naphthalenetetracarboxylic dianhydridem, 1,3-dimethyl-2-phenyl-2,3-dihydro-1H-benzoimidazole, and combinations thereof.

According to certain embodiments, electrodes for use in electrochemical cells are formed from an active material, a binder material, and a conductive material. The active material is typically in particulate form, but it may take other forms. Prior to forming the electrode, active materials are coated using compounds according to embodiments of the invention. In certain embodiments, the compound "wets" the particles of the active material. The compound can wet the particles due to being in solution or due to melting. According to certain embodiments, preferred compounds for coating active material particles would both wet the particles and form a conductive coating at a temperature below about 500 degrees C. According to certain embodiments, preferred carbon precursors for coating carbon-fluoride particles would both wet the particles and form a conductive coating at a temperature below about 600 degrees C. to about 700 degrees C. Preferably, the compounds produces a substantially conductive carbon coating at temperatures below the range of decomposition temperatures for the active materials.

According to certain embodiments of the invention, the compound is mixed with a solvent. In these embodiments, solvents are paired with compounds based on solubility, wettability, viscosity, flashpoint, volatility, and other properties. The compound and the solvent are mixed using any means of mixing, including ball milling. In certain embodiments, active material and polymer are ball-milled with acetone as a solvent. Examples of appropriate solvents include acetone, NMP, methanol, hexane, acetonitrile, THF, DMSO, pyridine, benzene, water, ethanol, isopropanol, and combinations thereof. In certain embodiments, the solvent improves the wetting of the compound onto active material particles to produce a more uniform and complete coating prior to the heating step. In other embodiments, the solvent aids the processing of compound particles and active material particles to improve mixing and/or control particle size prior to the heating step. Such improvements in the uniformity and completeness of the coating prior to heating provide more uniform and complete carbon coatings on the active material after heating.

According to certain embodiments, the active material, compound, and solvent are mixed using a method such as ball milling. Preferably, the active material, coating compound, and solvent are mixed using a method that produces a substantially uniform and complete coating of the coating compound on the active material. In some embodiments, the active material, compound, and solvent are agitated to produce a substantially uniform and complete coating of the compound on the active material. In some embodiments, the active material and the coating compound are mixed without a solvent.

According to certain embodiments, the mixture of the active material, compound, and solvent forms a slurry. In certain embodiments, the slurry is heated to produce a conductive carbon coating on the active material. In certain embodiments, it is preferable for the heating to occur under inert atmosphere.

According to certain embodiments, the heating conditions are chosen to produce a thin layer of conducting carbon on the active material while limiting degradation of the active electrode material. In some embodiments, the heating occurs at a range of temperatures from about 300 degrees C. to about 700 degrees C., or preferably from about 400 degrees C. to about 600 degrees C. In some embodiments, the heating occurs at less than about 500 degrees C. Preferably, the heating occurs at less than about 450 degrees C. Preferably, the heating occurs at less than about 400 degrees C. Preferably, the heating occurs at less than about 350 degrees C. Preferably, the heating occurs at less than about 300 degrees C. Preferably, the heating occurs at less than about 250 degrees C. Preferably, the heating occurs at less than about 200 degrees C. Preferably, the heating occurs at less than about 150 degrees C. Preferably, the heating occurs at less than about 100 degrees C.

In certain embodiments, it is preferable to tailor the annealing such that the sp or $sp^2$ hybridized atoms are not decomposed and that the delocalized electrons of the conjugated cores are substantially maintained. However, it is also preferable to provide the system with sufficient energy (e.g., thermal and/or mechanical energy) to yield desirable coverage on the particles of active material. In certain embodiments, lower annealing temperatures increase battery capacity but reduce voltage performance. In certain embodiments, a reaction occurs between the coating precursor and the active materials such that the system undergoes a color change, which may be evidence of bonding between the coating compounds and the active materials.

In some embodiments, the heating occurs for less than about 6 hours. Preferably, the heating occurs for less than about 5 hours. Preferably, the heating occurs for less than about 4 hours. Preferably, the heating occurs for less than about 3 hours. Preferably, the heating occurs for less than about 2 hours. Preferably, the heating occurs for less than about 1 hours.

According to certain embodiments, the coated active materials are further mixed with a binder material and a conductive material. In such embodiments the mixing can be done by suitable methods, such as ball milling, to form an electrode-forming material. The electrode-forming material is typically composed primarily of coated active material, preferably in the range of from about 85% to about 97% of active material. The remainder of the electrode-forming material is composed of the binder material and the conductive material. The binder material is typically present at about 2.5% to about 11%. In certain embodiments, the conductive material is present in a range of from about 0.5% to about 7.5%.

As described in the examples below, certain embodiments produce coated electrodes that deliver higher power, increased operating voltage, higher capacity at a high discharge rate, and reduced heat buildup when compared with uncoated electrodes. Without being bound by a particular principle, hypothesis, or method of action, coatings of certain embodiments of the invention provide a low resistance pathway for electron and lithium ion transport, which significantly lowers the electrode resistance. One consequence of this is an electrochemical cell with higher power and lower underpotential. As a result, higher capacity can be obtained when electrochemical cells are run at comparatively high rate.

As illustrated in certain examples herein, the coatings of certain embodiments of the invention address some of the challenges of batteries by enabling higher power, increasing operating voltage, increasing capacity at a high discharge rate, reducing heat generation, and increasing heat dissipation. For example, in high-drain applications certain embodiments improve the energy capacity of batteries such that a higher voltage may be achieved at a high current when compared to prior batteries. Certain embodiments extend the useful life of batteries under moderate to high drain conditions. Unexpectedly, the coatings of certain embodiments of the present invention address these challenges at low concentrations. Coated cathode materials according to certain embodiments of the invention demonstrated improved voltage and power at late depths of discharge.

Coated cathode materials according to certain embodiments of the invention were included in electrochemical cells according to the examples set forth below. In some situations, the electrolyte solution in the electrochemical cell included additives according to using materials and methods disclosed in copending U.S. patent application Ser. No. 13/612,798, which application is incorporated by reference herein in its entirety. The combination of the coated cathode materials of certain embodiments of the invention and such electrolyte solutions including additives demonstrated improved performance. In many cases, the performance improvements were substantially greater than the performance improvement realized by either the coating or the additive on its own.

The following examples describe specific aspects of some embodiments of the invention to illustrate and provide a description for those of ordinary skill in the art. The examples should not be construed as limiting the invention, as the examples merely provide specific methodology useful in understanding and practicing some embodiments of the invention.

EXAMPLES

Example 1

Fabrication of Conductively Coated Electrodes from Carbon Precursor Materials

Materials and Synthetic Methods.
Carbon-fluoride active material was milled with carbon precursors at medium energy, followed by post annealing. Carbon precursors included KJ600 (carbon black), PEG, PVDF, and sucrose. The carbon precursor loading was 5 wt %. The annealing conditions were 450 and 600 degrees C. for 2 and 6 hours.

Example 2

Fabrication of Conductively Coated Electrodes With and Without Additive Materials Methods were the same as in Example 1, with the following changes:
Poly(vinylidene fluoride) was used as a carbon precursor; the carbon precursor loading had three conditions (1, 3, 5 wt %); the annealing conditions were 450 and 500 degrees C. at 3, 6 and 12 hours.

Example 3

Fabrication of Conductively Coated Electrodes from Conjugated Core Compounds

Materials and Synthetic Methods.
All reactions were prepared in a high purity argon filled glove box (M-Braun, $O_2$ and humidity contents <0.1 ppm). Unless otherwise specified, materials were obtained from commercial sources (e.g., Sigma-Aldrich, Advanced Research Chemicals Inc., and Alfa Aesar) and used without further purification.

Carbon Coating.
CFx, LMO and LMNO particles were coated with conductive carbon materials through a milling process. Milling vessels were loaded with the base cathode material, conductive carbon coating precursor materials, and solvents. The conductive carbon coating precursor materials are loaded in a range of 0-5 wt %. The vessels were sealed and their contents then milled. After milling, solvents were evaporated at about 60 degrees C. and, in certain embodiments, samples were annealed under flowing $N_2$.

Electrode Formulation.
In the case of coated CFx particles, electrodes were prepared with a formulation composition of 85% active materials, 11% binder materials, and 4% conductive additive according to the following formulation method: About 200 milligrams PVDF (Sigma Aldrich) was dissolved in 10 milliliters NMP (Sigma Aldrich) overnight. About 72.7 milligrams of conductive additive was added to the solution and allowed to stir for several hours. About 154 milligrams of coated CFx solid was added to 1 milliliters of this solution and stirred overnight. Films were cast by dropping about 100 microliters of slurry onto stainless steel current collectors and drying at 150 degrees C. for about 1 hour. Dried films were allowed to cool, and were then pressed at a pressure of 1 ton/cm$^2$. Electrodes were further dried at 150 degrees C. under vacuum for 12 hours before being brought into a glove box for battery assembly.

Electrode Formulation.
In the case of coated LMO, LMNO, and OLO particles, electrodes were prepared with a formulation composition of 85% active materials, 7.5% binder materials, and 7.5% conductive additive according to the following formulation method: About 198 milligrams PVDF (Sigma Aldrich) and about 198 milligrams of Super P Li (Timcal) were dissolved in 15 milliliters NMP (Sigma Aldrich) overnight. About 150 milligrams of coated LMO, LMNO, or OLO solid was added to 1 milliliters of this solution and stirred overnight. Films were cast by dropping about 66 microliters of slurry onto stainless steel current collectors and drying at 150 degrees C. for about 1 hour. Dried films were allowed to cool, and were then pressed at a pressure of 1 ton/cm$^2$. Electrodes were further dried at 150 degrees C. under vacuum for 12 hours before being brought into a glove box for battery assembly.

Example 4

Formation of Electrochemical Cells Containing Coated Electrodes

All batteries were assembled in a high purity argon filled glove box (M-Braun, $O_2$ and humidity contents <0.1 ppm), unless otherwise specified.

Primary CFx cells were made using lithium as an anode, Celaguard 2400 as a separator, and 180 microliters of 1M $LiBF_4$ in 1:1 PC:DME as an electrolyte.

Secondary LMO and LMNO half cells were made using lithium as an anode, Celaguard 2400 as a separator and 90 microliters of 1M $LiPF_6$ in 1:2 EC:EMC (Novalyte) as an electrolyte.

Example 5

Testing of Electrochemical Cells Containing Coated Electrodes

Electrochemical cells formed according to Examples 1 and 2 were tested using a variety of test methods. When compared to electrochemical cells without coated electrodes, certain electrochemical cells exhibited increases in performance.

Figure 1B:
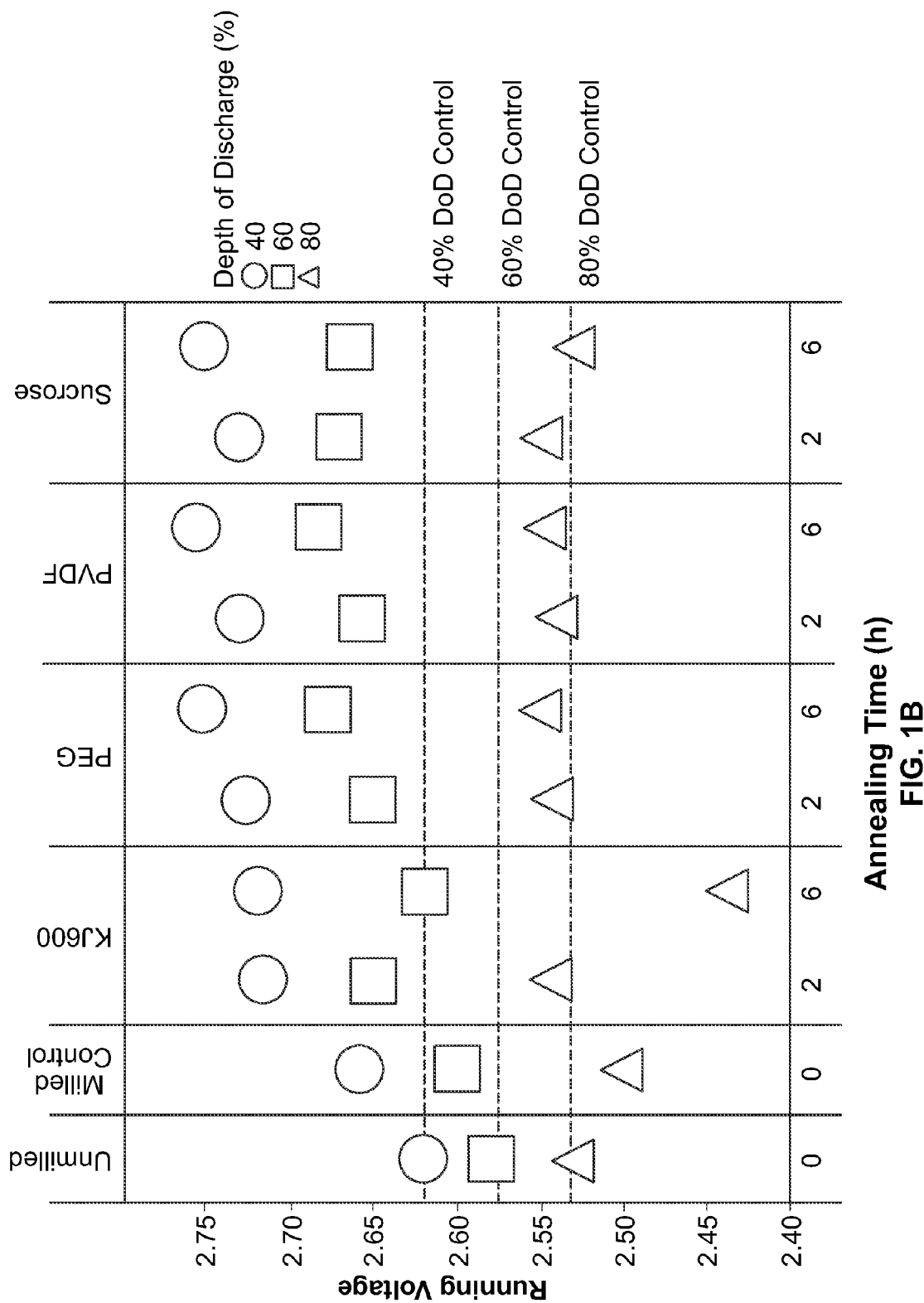
Figure 2:
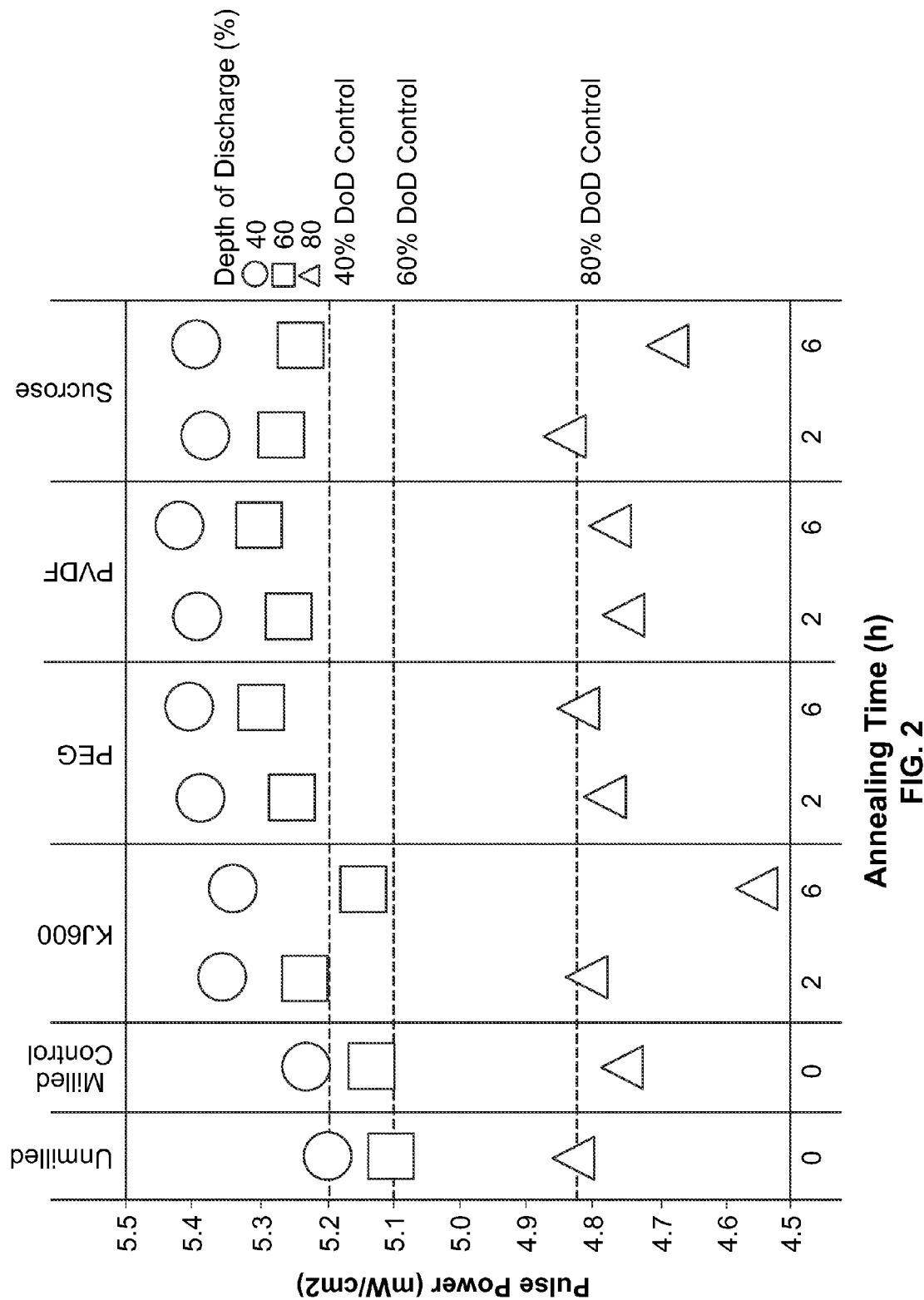
FIG. 2 depicts the results of testing of an electrochemical cell containing cathode active materials coated according to certain embodiments of the invention as compared to control. Certain coating materials demonstrate improved pulse power performance.
Figure 3:
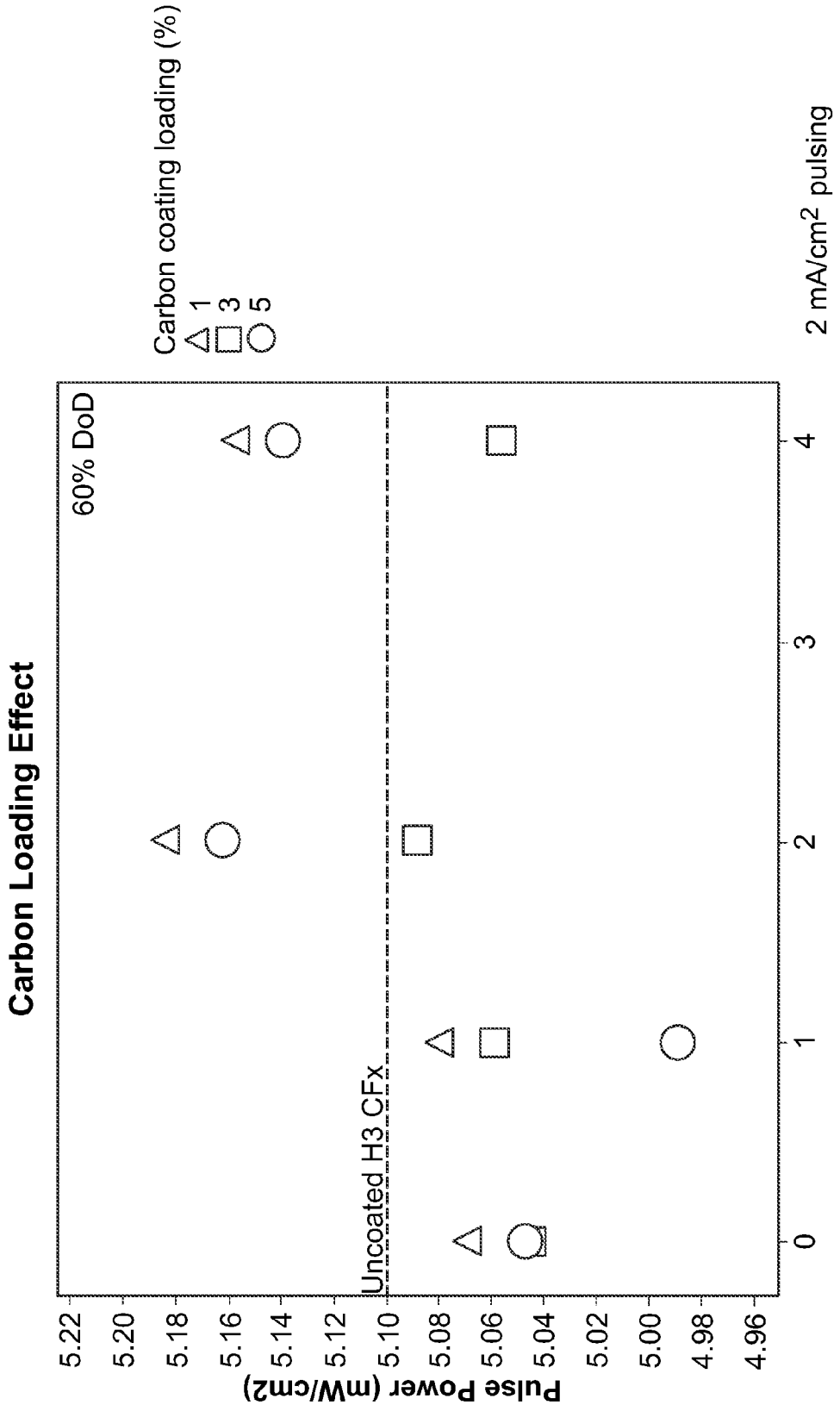
FIG. 3 depicts the results of testing of an electrochemical cell containing cathode active materials coated according to certain embodiments of the invention as compared to control. Certain coating materials demonstrate improved pulse power performance.
Figure 4:
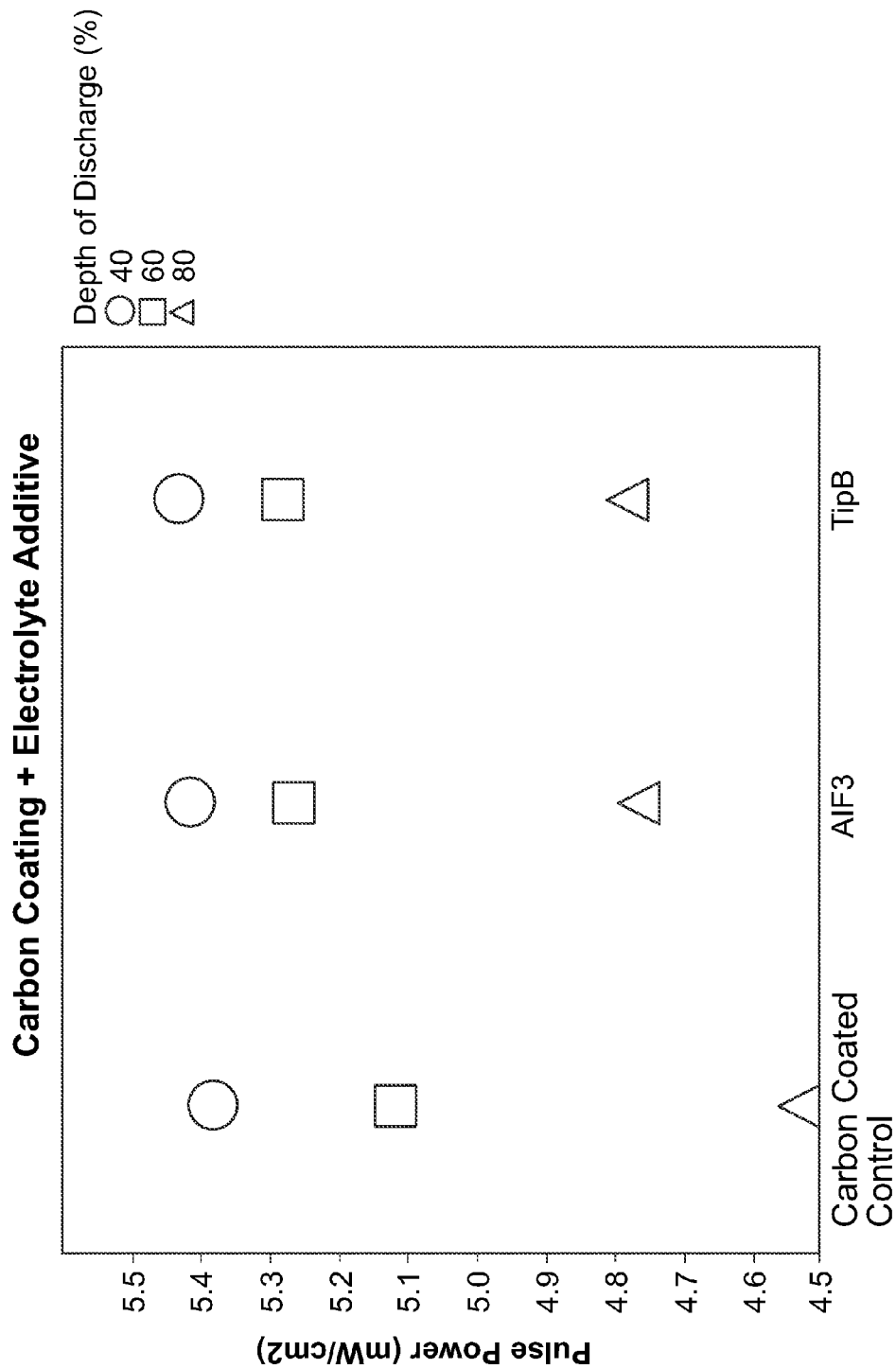
FIG. 4 depicts the results of testing of an electrochemical cell containing cathode active materials coated according to certain embodiments of the invention as compared to control. Certain coating materials demonstrate improved pulse power performance.
Figure 5:
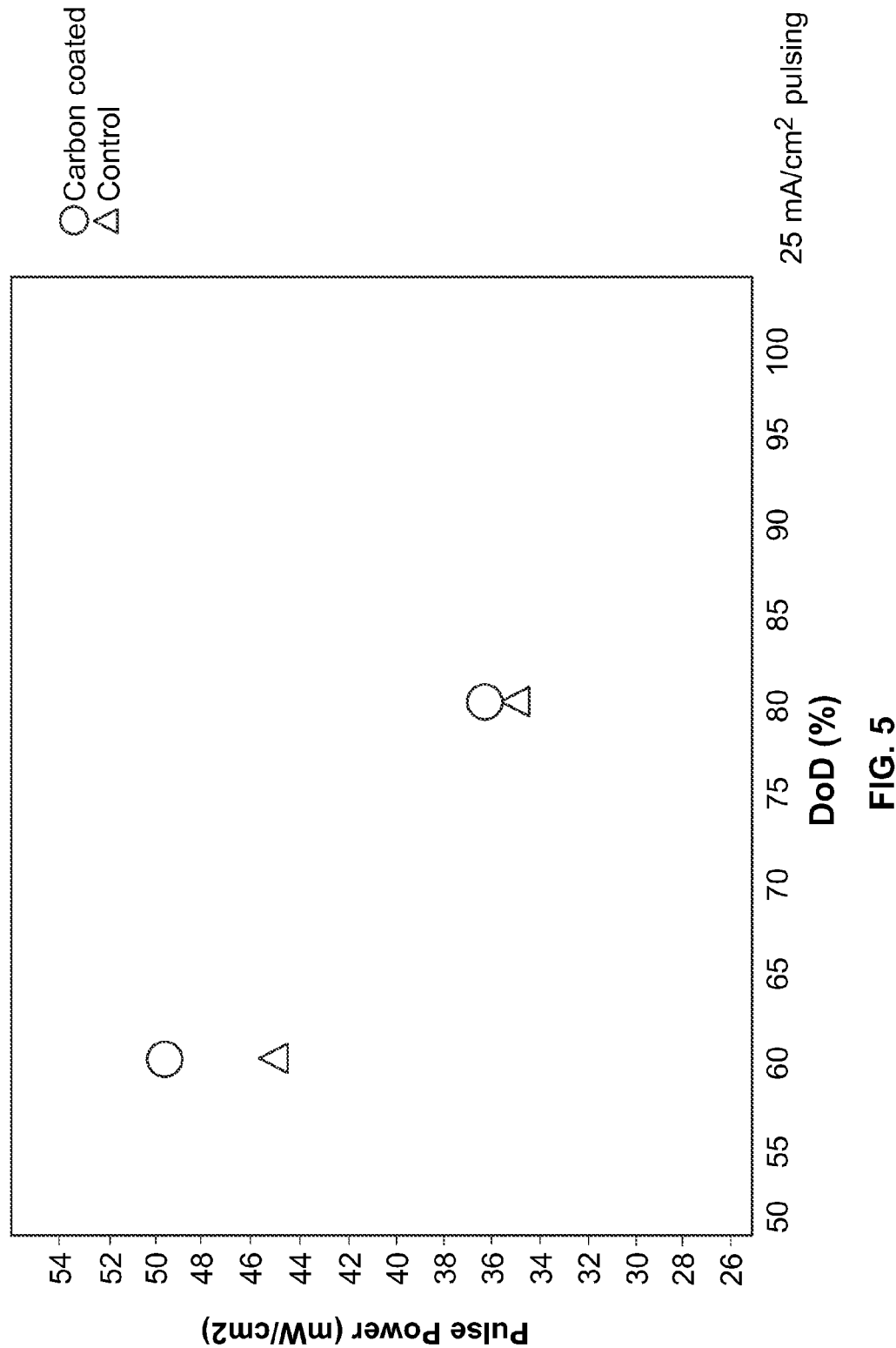
FIG. 5 depicts the results of testing of an electrochemical cell containing cathode active materials coated according to certain embodiments of the invention as compared to control. Certain coating materials demonstrate improved pulse power performance versus depth of discharge.
Figure 6:
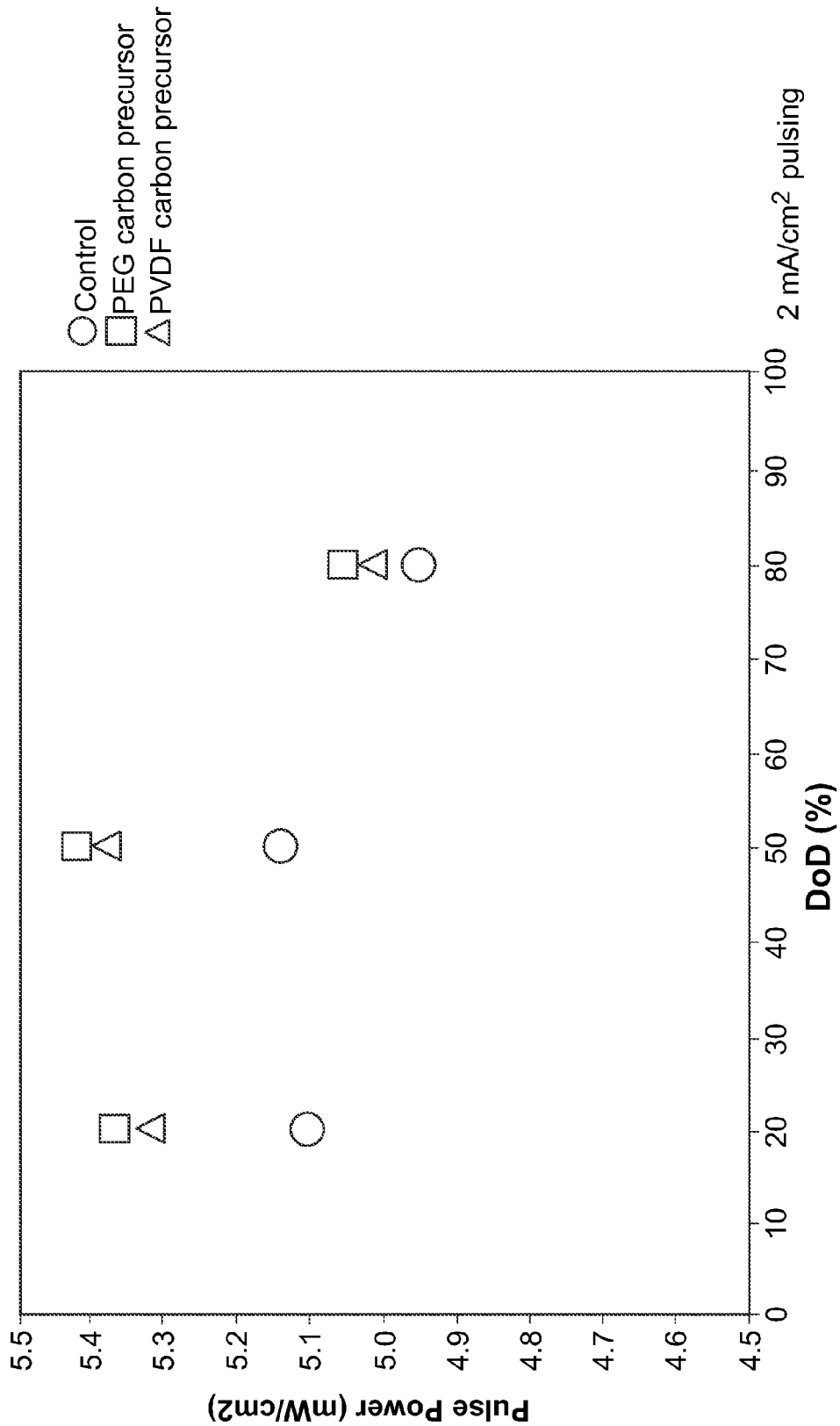
FIG. 6 depicts the results of testing of an electrochemical cell containing cathode active materials coated according to certain embodiments of the invention as compared to control. Certain coating materials demonstrate improved pulse power performance versus depth of discharge.

For example, as depicted in FIG. 1, coated electrodes resulted in about a 100-150 mV increase in open circuit voltage in a CFx/SVO hybrid cell below 60% depth of discharge (DoD). As depicted in FIG. 1, coated electrodes resulted in about a 50-150 mV increase in operating voltage from 20-60% depth of discharge (DoD) in a CFx/SVO hybrid cell. As depicted in FIG. 2, coated electrodes resulted in about a 0.2 $mW/cm^2$ increase in pulse power at 2 $mA/cm^2$ pulse current in a CFx/SVO hybrid cell at and below 60% DoD. As depicted in FIG. 3, coated electrodes using as low as half of the conductive additive in the standard electrode formulation resulted in about a 0.1 $mW/cm^2$ increase in pulse power at 2 $mA/cm^2$ pulse current in a CFx/SVO hybrid cell at 60% DoD compared to the standard formulation with uncoated CFx. As depicted in FIG. 4, coated electrodes behave synergistically with some electrolyte additives resulting in 0.1-0.2 $mW/cm^2$ increase in pulse power at 2 $mA/cm^2$ pulse current in a CFx/SVO hybrid cell at 60-80% DoD compared to the coated electrode without electrolyte additive. As depicted in FIG. 5, coated electrodes resulted in about a 5 $mW/cm^2$ increase in pulse power at 25 $mA/cm^2$ pulse current in a CFx/SVO hybrid cell at 60% DoD. As depicted in FIG. 6, coated electrodes prepared using both fluorinated (PVDF) and non-fluorinated (PEG) carbon precursors resulted in about a 0.2-0.3 $mW/cm^2$ increase in pulse power at 2 $mA/cm^2$ pulse current in a CFx/SVO hybrid cell at and below 50% DoD.

Example 6

Testing Protocol for Primary Electrochemical Cells Containing Coated Electrodes Electrodes and cells designed as primary cells were electrochemically characterized at 30 degrees C. using a constant current discharge protocol at 0.1 C and 1 C.

Example 7

Testing Protocol for Secondary Electrochemical Cells Containing Coated Electrodes Electrodes and cells designed as secondary were electrochemically characterized at room temperature (~23° C.) using the following protocol: (1) cells were conditioned in a cycle where charging and discharging took place at a C-rate of C/20, including a constant current, constant voltage discharge until the current reached C/100; (2) cells were tested for charge capacity retention by stepping through various C-rates (2 C, 1 C, 0.5 C, 0.1 C) with a 3 hour open current hold periods in between each C-rate. For LMO active materials, the charging voltage was 4.5V. For LMNO active materials, the charging voltage was 4.95V. The cells are discharged by stepping through various C-rates (2 C, 1 C, 0.5 C, 0.1 C) with a 3 hour open current hold periods in between each C-rate; (3) cells were cycled to produced an overlithiated phase by cycling at a charge and discharge C-rate of C/10, including a 3 hour open current hold period; and (4) cells were tested again as in step (2).

Example 8

Testing of Primary Electrochemical Cells Containing Coated Electrodes

Figure 7:
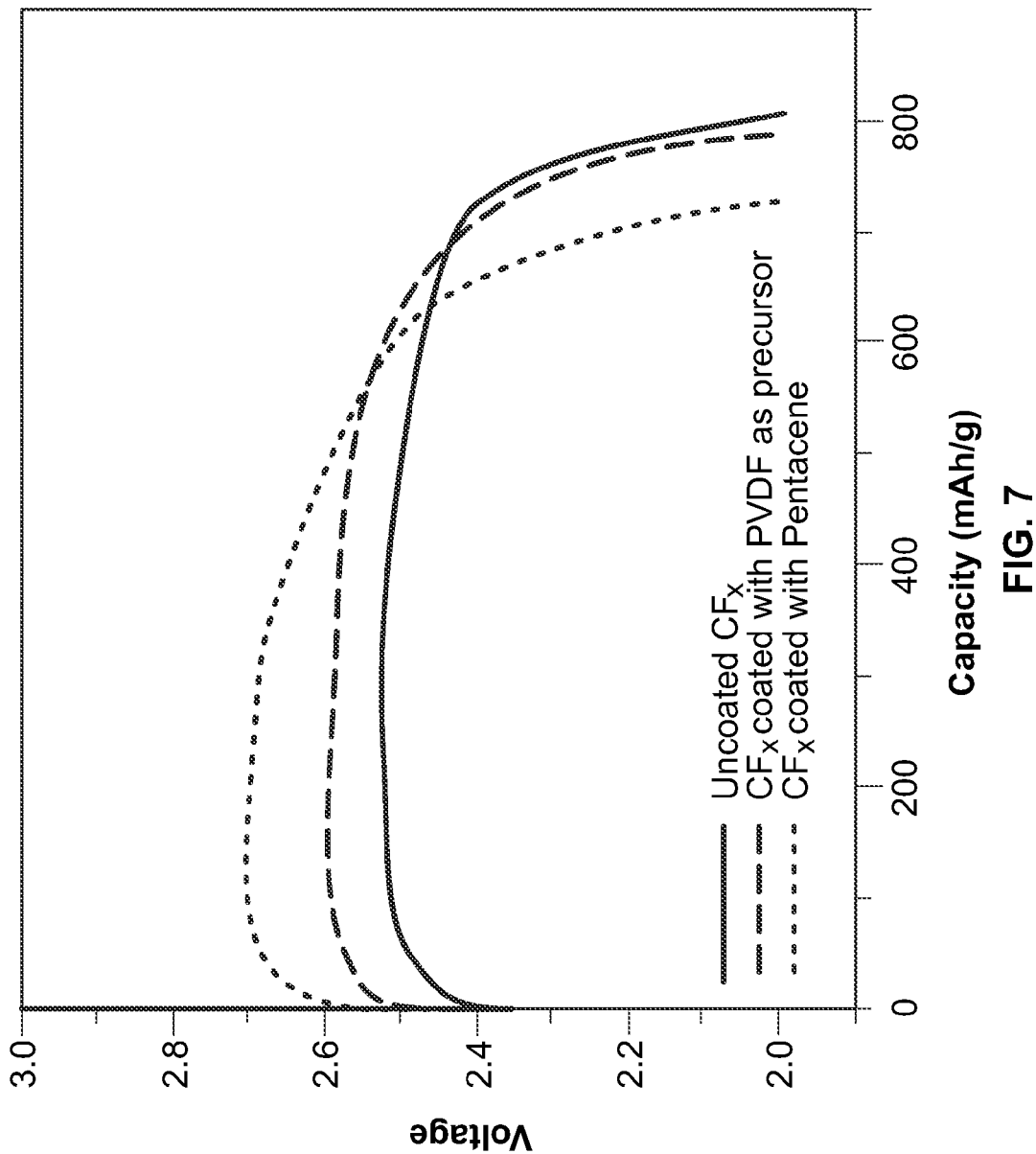
FIG. 7 depicts the results of testing of an electrochemical cell containing cathode active materials coated according to certain embodiments of the invention as compared to control. Certain coating materials demonstrate improved voltage performance as a function of capacity.

Primary cells assembled according to Examples 3 and 4 with a CFx cathode were tested according to Example 6. The cathodes in the 0.1 C discharge test consisted of: (1) uncoated CFx active material; (2) CFx active material coated according to graphitization methods with a carbon coating deposited using a PVDF precursor material; and (3) CFx active material coated with pentacene. FIG. 7 illustrates an improvement in the operating voltage in the pentacene-coated sample.

Example 9

Testing of Primary Electrochemical Cells Containing Coated Electrodes

Figure 8A:
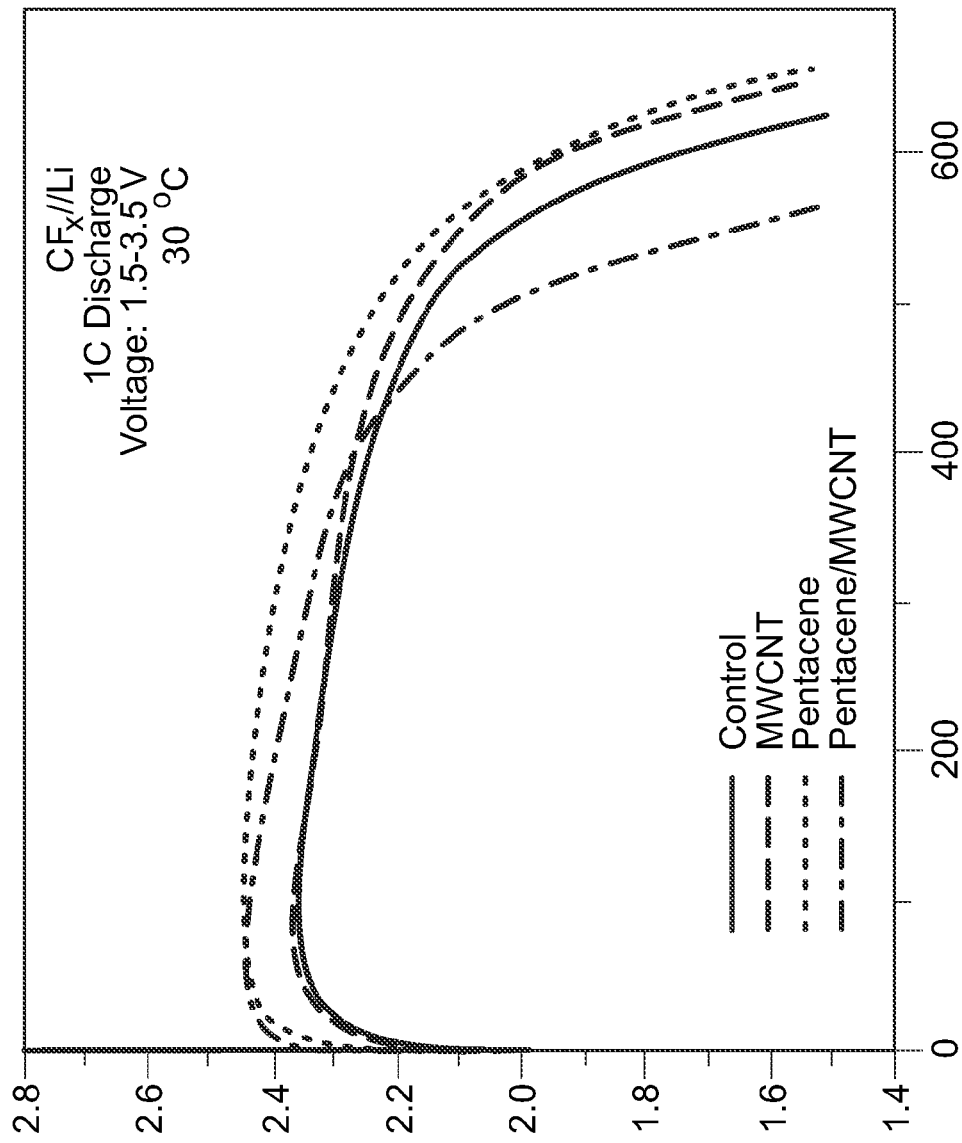
FIGS. 8A and 8B depict the results of testing of an electrochemical cell containing cathode active materials coated according to certain embodiments of the invention as compared to control. Certain coating materials demonstrate improved voltage performance as a function of capacity.
Figure 8B:
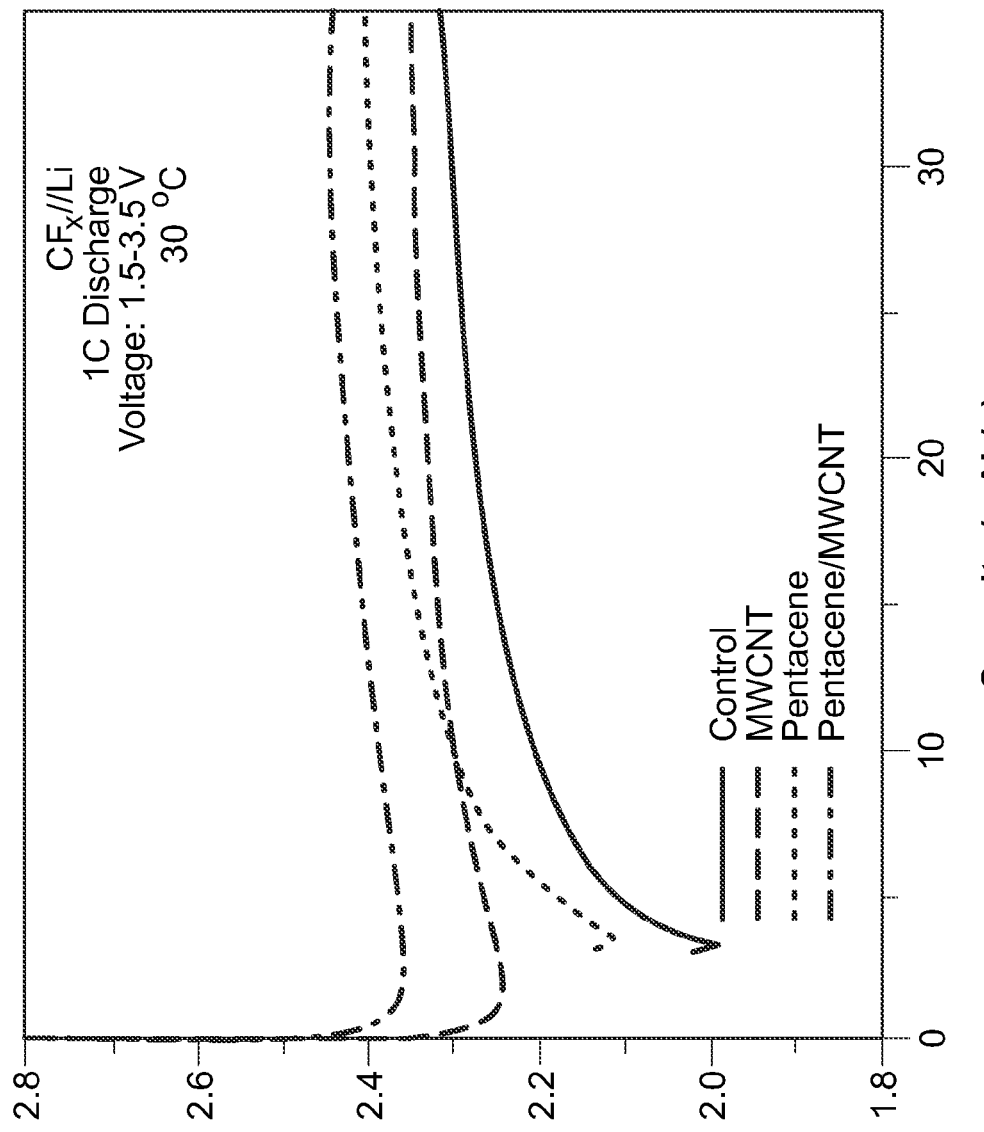

Primary cells assembled according to Examples 3 and 4 with a CFx cathode were tested according to Example 6. The cathodes in the 1 C discharge test consisted of: (1) uncoated CFx active material; (2) CFx active material coated with MWCNT; (3) CFx active material coated with pentacene; and (4) CFx active material coated with a mixture of MWCNT and pentacene. FIG. 8 illustrates an improvement in the operating voltage and the voltage delay in the pentacene-coated and the pentance/MWCNT samples.

Example 10

Testing of Primary Electrochemical Cells Containing Coated Electrodes

Figure 9:
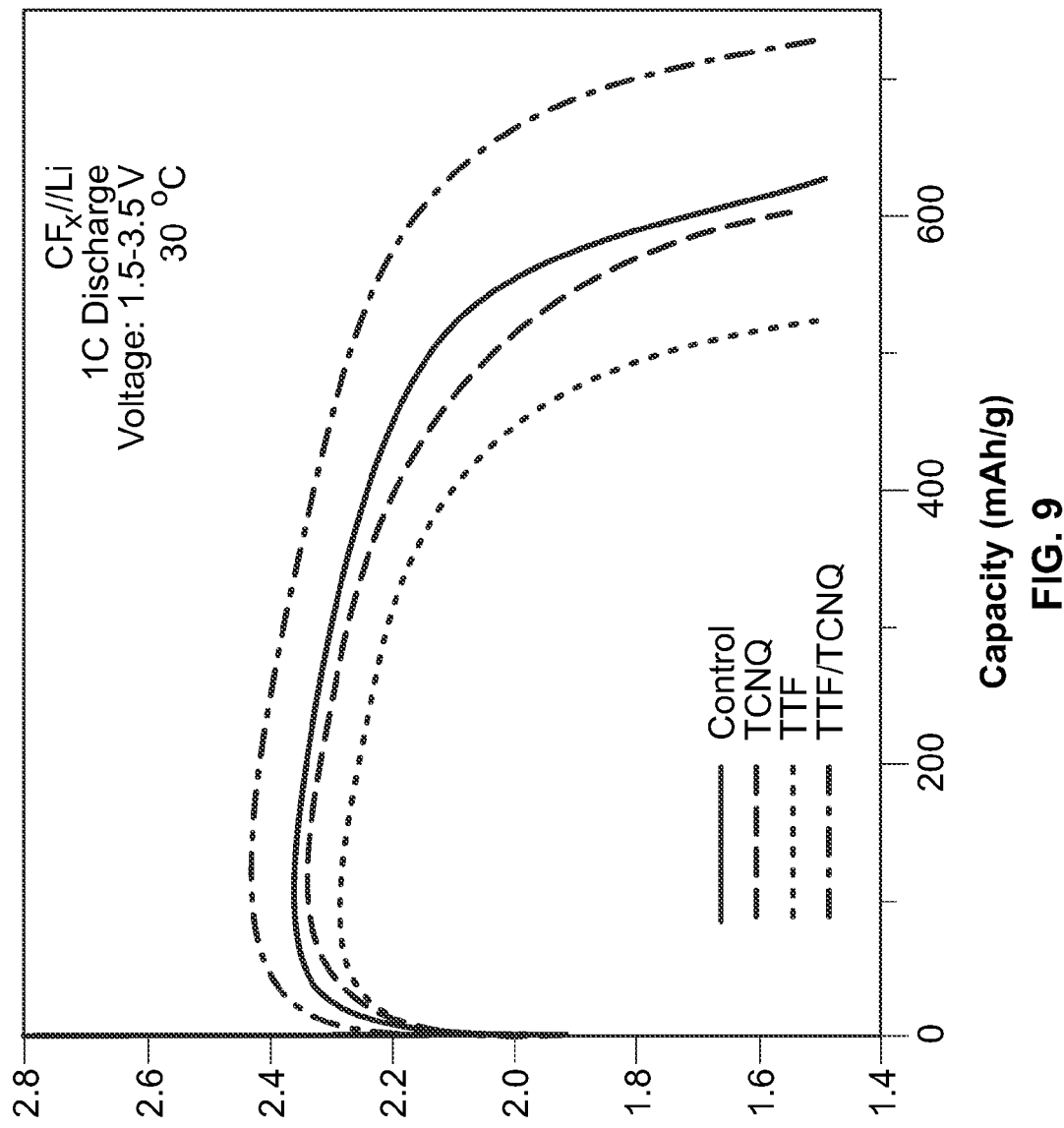
FIG. 9 depicts the results of testing of an electrochemical cell containing cathode active materials coated according to certain embodiments of the invention as compared to control. Certain coating materials demonstrate improved voltage performance as a function of capacity.

Primary cells assembled according to Examples 3 and 4 with a CFx cathode were tested according to Example 6. The cathodes in the 1 C discharge test consisted of: (1) uncoated CFx active material; (2) CFx active material coated with 7,7,8,8-tetracyanoquinodimethane; (3) CFx active material coated with tetrathiafulvalene; and (4) CFx active material coated with a mixture of tetrathiafulvalene and 7,7,8,8-tetracyanoquinodimethane. FIG. 9 illustrates an improvement in the operating voltage and the voltage delay in the mixture of tetrathiafulvalene and 7,7,8,8-tetracyanoquinodimethane samples.

Example 11

Testing of Secondary Electrochemical Cells Containing Coated Electrodes

Figure 10A:
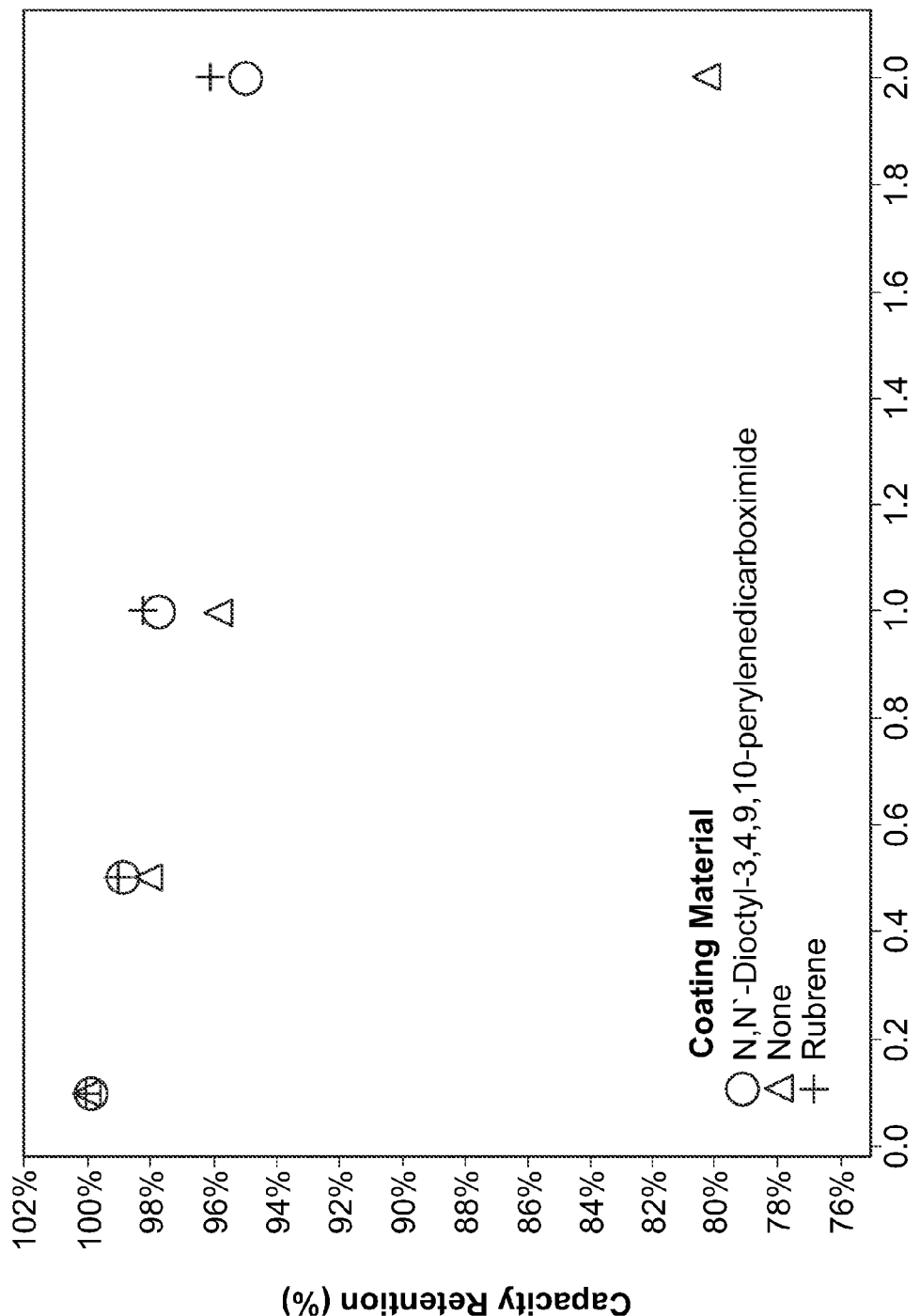
FIGS. 10A and 10B depict the results of testing of an electrochemical cell containing cathode active materials coated according to certain embodiments of the invention as compared to control. Certain coating materials demonstrate improved capacity retention.
Figure 10B:
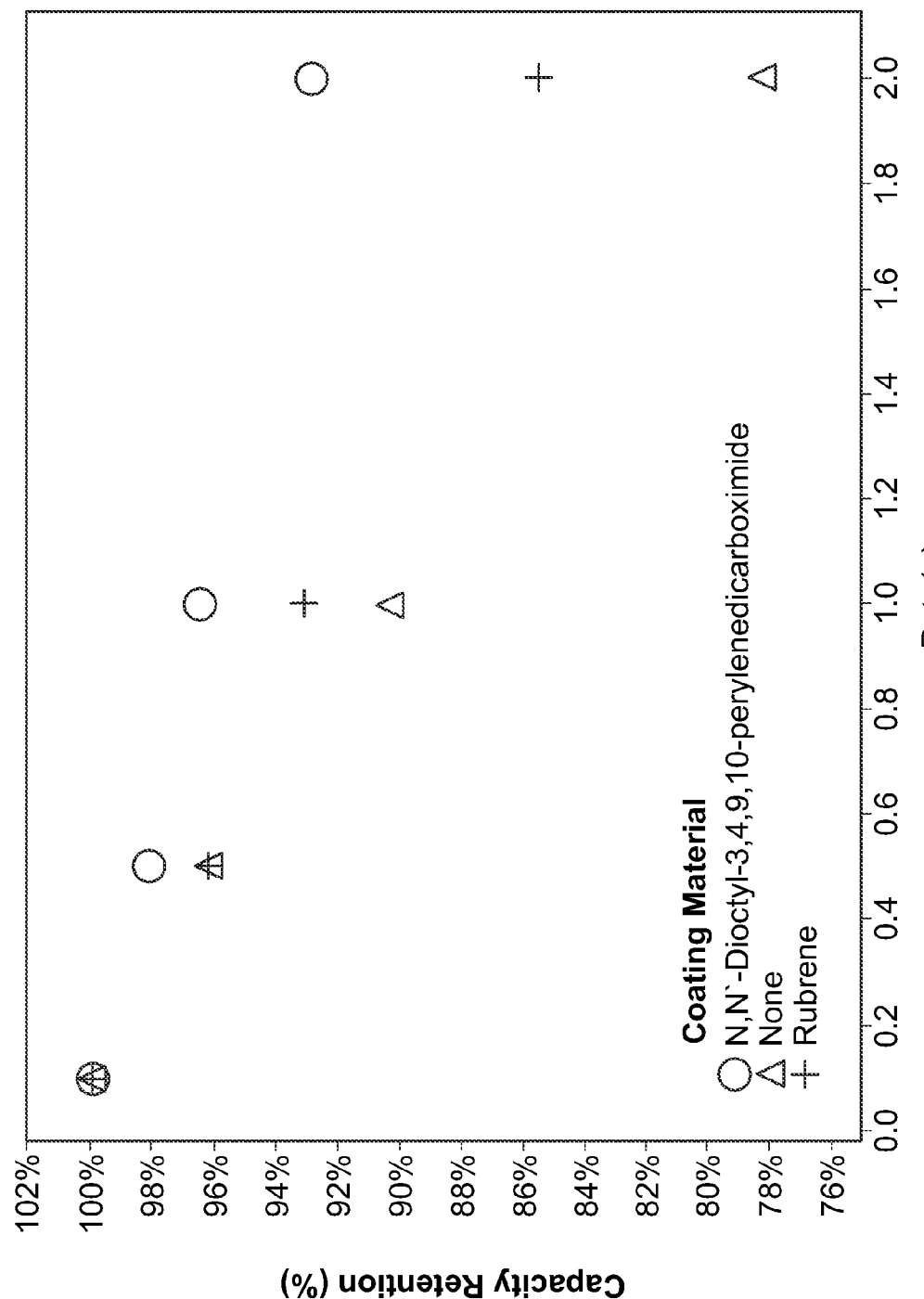

Secondary cells were assembled according to Examples 3 and 4. The cathodes in the test consisted of: (1) uncoated LMO active material; (2) uncoated LMNO active material; (3) LMO active material coated with rubrene; and (4) LMNO active material coated with rubrene; (5) LMO active material coated with N,N'-dioctyl-3,4,9,10 perylenedicarboximide; and (6) LMNO active material coated with N,N'-dioctyl-3,4, 9,10 perylenedicarboximide. FIGS. 10A (LMO) and 10B (LMNO) illustrate an improvement in the capacity retention at high C rates for the coated materials.

Example 12

Figure 11:
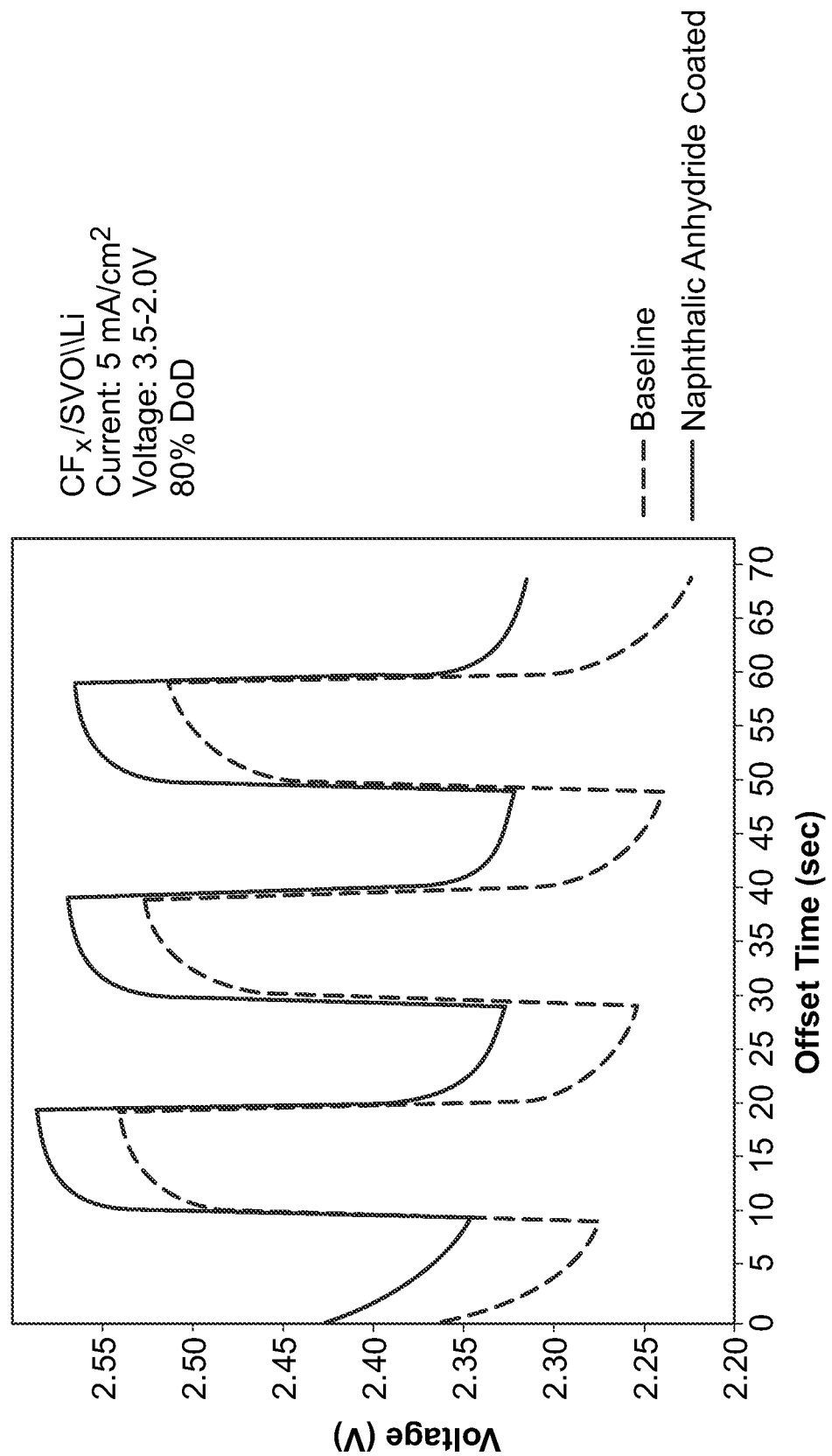
FIG. 11 depicts the results of testing of an electrochemical cell containing cathode active materials coated according to certain embodiments of the invention as compared to control. Certain coating materials demonstrate improved voltage performance.

Voltage and Power Testing of Electrochemical Cells Containing Coated Electrodes Electrodes and cells were electrochemically characterized at 37 degrees C. using the following protocol: 0.01 C background discharge with high current pulsing at predefined depths of discharge for power measurements. Pulsing was carried out at 5 mA/cm$^2$ for 10 seconds followed by 10 seconds of OCV. Pulsing was done in sets of four pulses and the cell rested at OCV for 10 hours prior to the first pulse and after the fourth pulse. FIG. 11 illustrates the pulse power improvement of the best carbon coated CF$_x$ at 80% depth of discharge.

Table 1 lists coating materials tested and their performance in voltage and rate capability testing as compared to a control. Cells were fabricated using a hybrid cathode (CFx/SVO) material coated with the carbon source listed in Table 1. Rate capability is expressed as the percentage of the discharge at C rate as compared to 0.1 C rate.

TABLE 1

Performance of Coating Materials

| Carbon Source | Anneal Temp (degrees C.) | Voltage at 1 C (V) | Rate Capability C/0.1 C (%) |
|---|---|---|---|
| Control | 0 | 2.20 | 78.54 |
| PVDF | 450 | 2.27 | 75.02 |
| Tris[4-(5-dicyanomethylidenemethyl-2-thienyl)phenyl]amine | 450 | 2.34 | 78.67 |
| Triphenylene | 250 | 2.21 | 62.09 |
| Tetrathiafulvalene | 250 | 2.26 | 76.22 |
| Rubrene | 425 | 2.41 | 86.37 |
| Pyrene | 300 | 2.28 | 77.64 |
| Polyaniline (emeraldine base) | 400 | 2.33 | 77.94 |
| Poly(3-hexylthiophene-2,5-diyl) | 300 | 2.27 | No Data |
| PNV | 300 | 2.25 | 55.74 |
| Perylene-3,4,9,10-tetracarboxylic dianhydride | 400 | 2.33 | 77.85 |
| Perylene | 400 | 2.41 | 85.81 |
| Pentacene/MWCNT | 400 | 2.30 | 76.75 |
| Pentacene/Anthracene (4:1) | 250 | 2.29 | 78.88 |
| Pentacene/Anthracene (1:4) | 250 | 2.27 | 75.86 |
| Pentacene-N-sulfinyl-tert-butylcarbamate | 350 | 2.31 | 74.36 |
| Pentacene | 400 | 2.39 | 81.20 |
| Napthalene | 100 | 2.24 | 75.42 |
| N,N'-Dioctyl-3,4,9,10-perylenedicarboximide | 425 | 2.40 | No Data |
| Dithieno[3,2-b:2?,3?-d]thiophene | 0 | 2.29 | No Data |
| Dilithium phthalocyanine | 400 | 2.35 | 79.18 |
| Dibenzotetrathiafulvalene | 300 | 2.27 | 78.08 |
| Dibenz[a,h]anthracene | 350 | 2.33 | 80.46 |
| Coronene | 450 | 2.36 | 81.51 |
| Copper(II) phthalocyanine | 400 | 2.30 | 77.71 |
| C60 | 350 | 2.17 | 51.84 |
| Bis(ethylenedithio)tetrathiafulvalene | 300 | 2.29 | 80.03 |
| Benz[b]anthracene | 400 | 2.35 | 78.46 |
| Anthracene | 250 | 2.27 | 76.13 |
| 29H,31H-Phthalocyanine | 350 | 2.33 | 77.22 |
| 11-Phenoxyundecanoic acid | 100 | 2.24 | 70.08 |
| 7,7,8,8-Tetracyanoquinodimethane | 300 | 2.24 | 73.52 |
| 6,13-Bis(triisopropylsilylethynyl)pentacene | 0 | 2.24 | 74.72 |
| 5,10,15,20-Tetrakis(pentafluorophenyl)porphyrin | 350 | 2.29 | 79.19 |
| 4-(Heptadecafluorooctyl)aniline | 100 | 2.24 | 71.59 |
| 2,2':5'',2'':5'',2'''-Quaterthiophene | 250 | 2.22 | 75.03 |
| 1,8-Naphthalic anhydride | 350 | 2.24 | 68.58 |
| 1,6-Diphenyl-1,3,5-hexatriene | 200 | 2.23 | 67.38 |
| 1,4,5,8-Naphthalenetetracarboxylic dianhydride | 350 | 2.28 | 68.75 |
| 1,3-Dimethyl-2-phenyl-2,3-dihydro-1H-benzoimidazole | 150 | 2.30 | 77.85 |

Table 2 lists coating materials tested using a hybrid cathode (CFx/SVO) material coated with the carbon source listed in Table 2. Table 2 reports the power measured for the cell at 70% depth of discharge and at 80% depth of discharge.

TABLE 2

Performance of Coating Materials

| Carbon Source | Anneal Temp (degrees C.) | Power (70% Capacity, mW/cm$^2$) | Power (80% Capacity, mW/cm$^2$) |
|---|---|---|---|
| Control | 0 | 12.08 | 11.50 |
| PVDF | 450 | 12.15 | 11.70 |
| Tris[4-(5-dicyanomethylidenemethyl-2-thienyl)phenyl]amine | 450 | 12.07 | 11.47 |
| Triphenylene | 250 | No Data | No Data |
| Tetrathiafulvalene | 250 | No Data | No Data |
| Rubrene | 425 | No Data | No Data |
| Pyrene | 300 | No Data | No Data |
| Polyaniline (emeraldine base) | 400 | No Data | No Data |
| Poly(3-hexylthiophene-2,5-diyl) | 300 | No Data | No Data |
| PNV | 300 | No Data | No Data |
| Perylene-3,4,9,10-tetracarboxylic dianhydride | 400 | 11.49 | 10.51 |
| Perylene | 400 | No Data | No Data |
| Pentacene/MWCNT | 400 | No Data | No Data |
| Pentacene/Anthracene (4:1) | 250 | No Data | No Data |
| Pentacene/Anthracene (1:4) | 250 | No Data | No Data |
| Pentacene-N-sulfinyl-tert-butylcarbamate | 350 | 11.72 | 11.40 |
| Pentacene | 400 | No Data | No Data |
| Napthalene | 100 | No Data | No Data |
| N,N'-Dioctyl-3,4,9,10-perylenedicarboximide | 425 | No Data | No Data |
| Dithieno[3,2-b:2?,3?-d]thiophene | 0 | No Data | No Data |
| Dilithium phthalocyanine | 400 | 10.13 | 9.88 |

TABLE 2-continued

Performance of Coating Materials

| Carbon Source | Anneal Temp (degrees C.) | Power (70% Capacity, mW/cm²) | Power (80% Capacity, mW/cm²) |
|---|---|---|---|
| Dibenzotetrathiafulvalene | 300 | 11.79 | 11.33 |
| Dibenz[a,h]anthracene | 350 | 10.96 | 10.52 |
| Coronene | 450 | 11.77 | 10.87 |
| Copper(II) phthalocyanine | 400 | 12.18 | 11.86 |
| C60 | 350 | No Data | No Data |
| Bis(ethylenedithio)tetrathiafulvalene | 300 | 11.85 | 11.45 |
| Benz[b]anthracene | 400 | 11.95 | 11.26 |
| Anthracene | 250 | No Data | No Data |
| 29H,31H-Phthalocyanine | 350 | No Data | No Data |
| 11-Phenoxyundecanoic acid | 100 | No Data | No Data |
| 7,7,8,8-Tetracyanoquinodimethane | 300 | No Data | No Data |
| 6,13-Bis(triisopropylsilylethynyl)pentacene | 0 | No Data | No Data |
| 5,10,15,20-Tetrakis(pentafluorophenyl)porphyrin | 350 | 12.03 | 11.53 |
| 4-(Heptadecafluorooctyl)aniline | 100 | No Data | No Data |
| 2,2':5',2":5",2'''-Quaterthiophene | 250 | 11.89 | 11.46 |
| 1,8-Naphthalic anhydride | 350 | 12.55 | 11.92 |
| 1,6-Diphenyl-1,3,5-hexatriene | 200 | No Data | No Data |
| 1,4,5,8-Naphthalenetetracarboxylic dianhydride | 350 | 12.50 | 11.88 |
| 1,3-Dimethyl-2-phenyl-2,3-dihydro-1H-benzoimidazole | 150 | 11.91 | 11.50 |

Table 3 lists coating materials tested and their performance in voltage and rate capability testing as compared to a control. Cells were fabricated using a pure CFx cathode material coated with the carbon source listed in Table 3. Rate capability is expressed as the percentage of the discharge at C rate as compared to 0.1 C rate.

TABLE 3

Performance of Coating Materials

| Carbon Source | Anneal Temp (degrees C.) | Voltage at 1 C (V) | Rate Capability C/0.1 C (%) |
|---|---|---|---|
| Control | 0 | 2.16 | 60.50 |
| PVDF | 450 | 2.23 | 64.15 |
| Tris[4-(5-dicyanomethylidenemethyl-2-thienyl)phenyl]amine | 450 | No Data | No Data |
| Triphenylene | 250 | No Data | No Data |
| Tetrathiafulvalene | 250 | 2.16 | 62.55 |
| Rubrene | 425 | 2.25 | 74.25 |
| Pyrene | 300 | 2.17 | 73.25 |
| Polyaniline (emeraldine base) | 400 | 2.24 | 66.84 |
| Poly(3-hexylthiophene-2,5-diyl) | 300 | No Data | No Data |
| PNV | 300 | No Data | No Data |
| Perylene-3,4,9,10-tetracarboxylic dianhydride | 400 | No Data | No Data |
| Perylene | 400 | 2.24 | 65.42 |
| Pentacene/MWCNT | 400 | 2.23 | 79.15 |
| Pentacene/Anthracene (4:1) | 250 | No Data | No Data |
| Pentacene/Anthracene (1:4) | 250 | No Data | No Data |
| Pentacene-N-sulfinyl-tert-butylcarbamate | 350 | No Data | No Data |
| Pentacene | 400 | 2.26 | 68.46 |
| Napthalene | 100 | 2.16 | 76.51 |
| N,N'-Dioctyl-3,4,9,10-perylenedicarboximide | 425 | No Data | No Data |
| Dithieno[3,2-b:2?,3?-d]thiophene | 0 | No Data | No Data |
| Dilithium phthalocyanine | 400 | No Data | No Data |
| Dibenzotetrathiafulvalene | 300 | No Data | No Data |
| Dibenz[a,h]anthracene | 350 | No Data | No Data |
| Coronene | 450 | No Data | No Data |
| Copper(II) phthalocyanine | 400 | No Data | No Data |
| C60 | 350 | 2.22 | 73.49 |
| Bis(ethylenedithio)tetrathiafulvalene | 300 | No Data | No Data |
| Benz[b]anthracene | 400 | No Data | No Data |
| Anthracene | 250 | 2.22 | 89.13 |
| 29H,31H-Phthalocyanine | 350 | 2.22 | 68.41 |
| 11-Phenoxyundecanoic acid | 100 | 2.17 | 82.40 |
| 7,7,8,8-Tetracyanoquinodimethane | 300 | 2.16 | 60.39 |
| 6,13-Bis(triisopropylsilylethynyl)pentacene | 0 | No Data | No Data |
| 5,10,15,20-Tetrakis(pentafluorophenyl)porphyrin | 350 | No Data | No Data |
| 4-(Heptadecafluorooctyl)aniline | 100 | 2.20 | 80.63 |
| 2,2':5',2":5",2'''-Quaterthiophene | 250 | No Data | No Data |
| 1,8-Naphthalic anhydride | 350 | No Data | No Data |
| 1,6-Diphenyl-1,3,5-hexatriene | 200 | 2.18 | 84.30 |
| 1,4,5,8-Naphthalenetetracarboxylic dianhydride | 350 | No Data | No Data |
| 1,3-Dimethyl-2-phenyl-2,3-dihydro-1H-benzoimidazole | 150 | No Data | No Data |

Various materials disclosed herein demonstrated improved performance as compared to control. In certain testing, naphthalic anhydride demonstrated a 3% capacity improvement, power performance improvement, and improved power stability over control. In certain testing, perylene demonstrated a 9% voltage improvement over control. In certain testing, rubrene demonstrated superior capacity at high voltage as compared to control.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

The invention claimed is:
1. An electrode for an electrochemical cell, comprising:
   particles of an active electrode material;
   a binder material; and
   wherein the particles are coated with an intrinsically conductive coating covalently attached to the particles of the active electrode material and wherein the coating is applied to the active electrode material and formed from a non-polymeric organic coating compound comprising a conjugated core, wherein the organic coating compound is not graphene and is not a carbon nanotube.
2. The electrode of claim 1 wherein organic coating compound comprises a conjugated core in which at least 90% of the carbon atoms are sp or $sp_2$ hybridized.

3. The electrode of claim 1 wherein the conjugated core is selected from the group consisting of a naphthalene core, a pentacene core, a perylene core, an anthracene core, and combinations thereof.

4. The electrode of claim 1 wherein the active electrode material comprises a carbon-fluoride compound.

5. The electrode of claim 1 wherein the active electrode material comprises an iron-fluoride compound.

6. The electrode of claim 1 wherein the active electrode material comprises a manganese-fluoride compound.

7. The electrode of claim 1 wherein the active electrode material comprises a copper-fluoride compound.

8. The electrode of claim 1 wherein the active electrode material comprises a metal-fluoride compound.

9. The electrode of claim 1 wherein the active electrode material comprises a lithium-manganese-nickel-oxygen compound.

10. The electrode of claim 1 wherein the active electrode material comprises a lithium-manganese-oxygen compound.

11. The electrode of claim 1 wherein the active electrode material comprises lithium-rich layered oxide compounds.

12. The electrode of claim 1 wherein the intrinsically conductive coating is formed at a temperature below 450 degrees C.

13. The electrode of claim 1 wherein the intrinsically conductive coating is a network of conjugated cores.

14. The electrode of claim 1 wherein each of the particles are coated with the intrinsically conductive coating.

\* \* \* \* \*